(12) United States Patent
Parkhurst

(10) Patent No.: US 6,668,284 B1
(45) Date of Patent: Dec. 23, 2003

(54) SOFTWARE MESSAGING SYSTEM

(75) Inventor: Jason Parkhurst, Indianapolis, IN (US)

(73) Assignee: Beckman Coulter, Inc., Fullerton, CA (US)

( * ) Notice: Subject to any disclaimer, the term of this patent is extended or adjusted under 35 U.S.C. 154(b) by 0 days.

(21) Appl. No.: 09/186,394

(22) Filed: Nov. 4, 1998

(51) Int. Cl.[7] ................................. G06F 9/54
(52) U.S. Cl. ........................ 709/313; 709/238
(58) Field of Search .................. 709/310–320, 709/238–245

(56) References Cited

U.S. PATENT DOCUMENTS

| 5,367,681 A | | 11/1994 | Foss et al. ................ 395/650 |
| 5,404,529 A | | 4/1995 | Chernikoff et al. ......... 395/700 |
| 5,511,199 A | | 4/1996 | Anthias et al. ............. 395/700 |
| 5,522,071 A | | 5/1996 | Guillen et al. ............. 395/650 |
| 5,563,878 A | * | 10/1996 | Blakeley et al. ........... 370/392 |
| 5,590,334 A | | 12/1996 | Saulpaugh et al. ......... 395/683 |
| 5,634,127 A | * | 5/1997 | Cloud et al. ............... 709/313 |
| 5,710,924 A | | 1/1998 | Ayoub et al. .............. 395/683 |
| 5,727,214 A | | 3/1998 | Allen ....................... 395/683 |
| 5,734,903 A | | 3/1998 | Saulpaugh et al. ......... 395/683 |
| 5,742,848 A | | 4/1998 | Burgess .................... 395/856 |
| 5,758,159 A | | 5/1998 | Collet ...................... 395/683 |
| 6,347,342 B1 | * | 2/2002 | Marcos et al. ............. 709/315 |

* cited by examiner

Primary Examiner—St. John Courtenay, III
(74) Attorney, Agent, or Firm—William H. May; D. David Hill; Ice Miller

(57) ABSTRACT

A software architecture includes a router that receives all messages from modules in a software system. Each message is associated with one of several pre-defined message translations, including message attributes, which are maintained by a Keeper database. Individual modules may send messages to the Router requesting that they receive messages having message attributes that match specified criteria. A common messaging control is encodes each message according to a hierarchical format so that any module receiving a message can decode the message and receive data elements from it without knowledge of the precise structure or sequence of data elements in the message.

25 Claims, 6 Drawing Sheets

SOFTWARE MESSAGING SYSTEM

FIELD OF THE INVENTION

The present invention relates to software programs that comprise software compliant, inter alia, with the Microsoft Component Object Model (COM) specification (and improved versions thereof, including but not limited to COM+), and in particular, to a system for minimizing modifications to modules in a software system when new functionality is added to the system, and for exchanging messages between software modules.

BACKGROUND OF THE INVENTION

A software system is generally comprised of multiple modules which communicate among each other by passing messages. For a message to be passed, the programmer must designate a format for the message, and write software to allow: (a) the sending program to encode the message in that format; and (b) the receiving program to decode the message in that format. The "encoding" comprises, in essence, determining the number, data types and sequence of the parameters for the message.

It is often desirable to modify software to add new functionality. In many instances, the new functionality does not add any new data, but merely uses data that is defined elsewhere in the system. Often, this existing data exists in the messages that are passed among the pre-existing modules. Nevertheless, to add the new functionality, it is usually necessary to modify the pre-existing modules that reference the data upon which the new functionality is based, and add references to the newly written modules that implement the new functionality.

For example, consider a simple system comprising a control module and a reader module. The existing functionality of the control module is to send a "read request" message to the reader module requesting the reader module to obtain a data reading from an attached (physical) reader, and the reader module sends a message back to the control module containing the reading. Suppose the system needs to be improved to add a module for logging every command or reading generated by each module of the system. In this example, the control and reader modules would both need to be modified so they by copy the command and reading data to a log file. For such a simple system, this may not require much work. However, most real systems would include hundreds of modules and objects, and each one would require modification. This would be a significant undertaking.

OBJECTS OF THE IVENTION

One object of the invention is to provide a software architecture that allows new functionality to be added to a pre-existing software system with few, if any, changes to the pre-existing software modules, by creating a new software module that merely accesses previously defined messages exchanged among the pre-existing software modules.

Another object of the invention is to provide a technique for encoding software messages according to a common format, so that any software module may receive a message sent by any other software module and extract from it the data it needs, regardless of how much other, unnecessary data may be included in the software message.

Another object of the invention is to provide a technique for changing the way messages are routed without changing software and without re-compiling.

Another object of the invention is to provide a technique for defining types of messages that are exchanged among software modules so that a programmer can specify characteristics of a message to be sent or received using a small number of lines of code.

Another object of the invention is to provide a software system in which software modules that send and receive messages according to a common format may use a single control for encoding and decoding messages in the common format, so that a programmer needs to write a small amount of code to send or receive messages in the common format.

SUMMARY OF THE INVENTION

Figure 1:
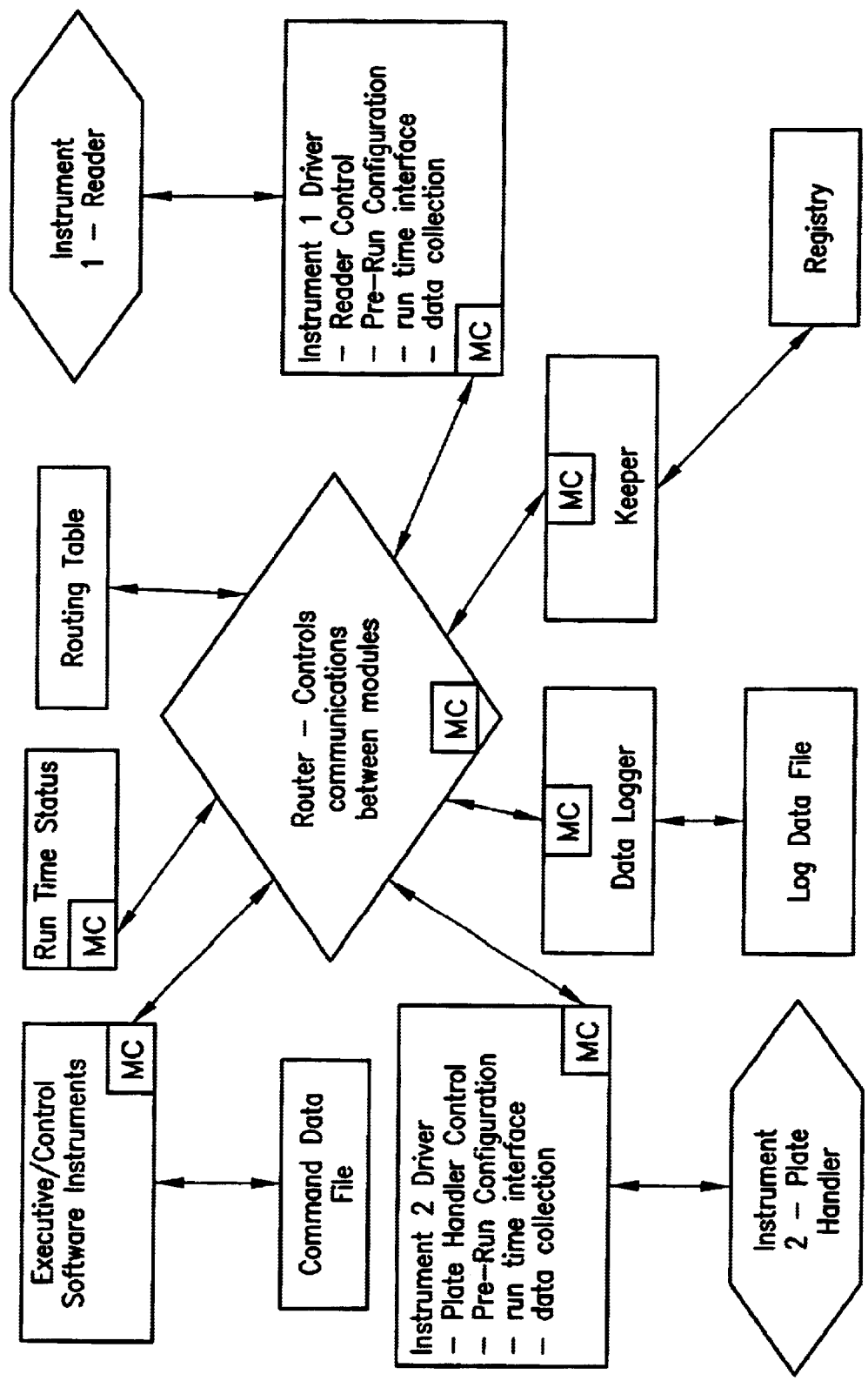
FIG. 1 shows the general components of a software architecture which may be combined in one embodiment of the present invention.

The invention comprises a software architecture that can eliminate or minimize changes to pre-existing software when adding new functionality. The principle features of the system are as follows.

1. A module called the Router. Instead of modules in a software system directly sending their messages to other modules, the modules send their messages to the Router. The Router, in turn, sends each received messages to each module that needs the particular message. The Router accesses a routing table to keep track of which modules should receive which messages. In one embodiment and as an option, individual modules may, during program execution, register and unregister requests to receive messages of various types from the Router.

2. Because messages passed among modules are usually in a virtually unlimited variety of formats, it is desirable to provide a common, flexible message format that allows the individual software modules to send and receive any message regardless of the data contained in the message. Accordingly, the invention includes a method for encoding messages to be transmitted and decoding (or parsing) received messages. In one embodiment, the encoding method comprises a hierarchical message encoding format.

3. A system database called the "Registry," which allows various message types to be defined, and a module for manipulating the Registry, which together are called a "Keeper."

4. A common software control (the "Messaging Control") is provided that can be included in each module of the system that uses the disclosed messaging technique. The Messaging Control interfaces with the Router. Specifically, the Messaging Control does the following:

a. Formats or "builds" all messages from the module so they are in a predetermined format. Each message may include a five-part address, comprising: ToName, ToType, FromName, FromType, and MessageType.

b. Sends all messages to the Router.

c. Receives and decodes all messages from the Router, and triggers an event in the Module in which it is embedded.

d. "Registers" message receipt requests by sending the Keeper (via the Router) specifications for the types of messages the Module wishes to receive.

e. "Unregisters" message receipt requests by sending the Keeper (via the Router) specifications for the types of messages the Module wishes to stop receiving.

One advantage to this architecture is that, when new functionality needs to be added to the software system in which some or all of the data needed exists in existing messages, few, if any changes are required to the pre-existing software modules. This is because the new functionality can be isolated to a newly developed software module. This new module merely sends to the Router a message indicating which pre-existing types of messages it wishes to receive.

The invention is particularly useful in software environments that experience frequent modifications, such as changes caused by continual improvements in hardware controlled by the software system, such as a robotic control software environment.

DETAILED DESCRIPTION

Overview

One embodiment of the invention comprises a software environment designed to ease the integration of robotic systems and to streamline the addition of new components. One feature of the invention is the ability to easily change the implementation of any one piece (module, also referred to as a component) without affecting other parts.

Many different things are involved in producing a system; for example, in a generic automation system, the following need to be developed:

Robot(s)
  Software to control the robot(s)
  Instruments and hardware (reader, hotels)
  Software to communicate with instruments
  Pre-run configuration and parameter specification
  Communication software between scheduled tasks and the instruments
  Run-time interface
  Data collection software To integrate these components into an automated system, they all must be able to interact. Without protocols to define interrelations, each system requires custom code making it different from all other systems and difficult to update. The present system attempts to regulate the interactions between components by defining a common interface, and isolating modules behind this interface.

The pieces in the above list fall into categories and each category takes on responsibilities. Instruments communicate with a module, which has a Messaging Control software component which facilitates its interaction with other modules. FIG. 1 shows the functions of different components in such a representative system, as well as two instruments and a data log file, which are external to the system. (In contrast, in a prior art system, each of the executive module, instrument driver 1 module, instrument driver 2 module, run time status module and data logger module might all have arrows between each other, indicating that all message are exchanged directly among these modules. Also the Router and Messaging Control (MC) would not be present.)

The various parts of the system are separate and independent of each other; they are each written to perform a certain function (e.g., device communication, user interface, data logging, etc.) without tight cohesion to another module. In effect, each module is like a black box with a set of inputs and outputs; to create a system, the appropriate black boxes are assembled and connected to each other. If a particular piece of the system needs to be modified, only its black box is changed. Any number of data consumer modules may be "connected" to the output of a module; similarly, any number of modules may provide inputs to a module.

In order to provide functionality, each module cannot operate on a completely independent basis, and communication between modules is well defined. Messages can be sent between modules to trigger an action, or as a reply to a previous message. Individual modules register which types of messages they wish to receive. When a message is sent, it is routed to all of the modules which have requested it.

One embodiment of the present invention parallels some fundamental operating systems concepts. The idea of a central kernel leads the system to have a Router which is connected to at least two modules (similar to a process which has protected memory). A Messaging Control (MC in FIG. 1) embedded in each module provides a messaging interface to the other modules (somewhat akin to Windows messages). Newer operating systems have moved to a system database concept where programs register any services they provide and keep track of configuration information. One embodiment of the present invention implements this concept through a module called the Keeper which communicates to a database called the Registry where module options and other system-related information is kept (similar to Windows RegEdit and Windows Registry). When integrating a new system, almost all of the configuration information may be stored here. Modules are brought together and then configured in the Registry so as to perform properly. Configuration settings are made in the Registry (e.g. COM ports or digital I/O settings) along with defining 'connections' between module inputs and outputs.

The module called the "Executive" could be several different things: an interpreter that reads data files, a custom front end accepting real-time user input, a program that has a hard-coded set of actions to take, etc. The important point is that the Executive is the driving force behind the system; somehow it decides what needs to be done (such as reading a plate in a robotic system) and issues the appropriate commands. It is not, however, the Executive's responsibility to deal with the details of communicating with the hardware (in this case a reader), logging data and displaying it for the user. It assumes that the system designer will put in place modules to deal with those things; it deals only with its own high-level responsibilities. The same philosophy holds true with each module in the system. The reader module only needs to handle communication and configuration of its associated hardware; while it does produce data and status information, it is not responsible for saving it, presenting it to the user or whatever else the system designer may wish. The module simply packages it in a standard format and sends it out. It is up to the system designer to see to it that there are appropriate modules to handle the data (i.e. consumers). If the system does not need to handle the data, no module is configured to listen to or collect the output, so the data is simply thrown away.

A conventional Executive module may interpret a data file and monitor the other modules when the system is running.

The first thing that happens is that the two major data consumers in our example are loaded (the Data Logger and Run-Time Status Module). The Data Logger, upon being loaded, will tell the router that it wishes to receive all data messages, and the Run-Time Status Module will tell the Router that it wants to receive all status messages. Then these modules will just sit and wait for their respective messages. At this point the Executive loads and begins to parse its code file; in the code file it finds the commands that it needs to send out and which modules to send them to. It loads all of the modules that it will be sending commands to and waits for them to initialize. In this case, the Instrument 1 (reader) and Instrument 2 (plate handler) modules are loaded. The Reader and plate handler will both tell the Router to send them all command messages, and begin waiting for commands to arrive. When the Executive comes to a command to be sent to the Reader, the Executive tells the Router to send the Executive all command completion messages from the Reader; the Executive is "listening" for the completion of its command. It then sends out the command and begins waiting. The Reader, having previously requested that it be sent commands, receives the command message from the Executive. The Reader module proceeds to carry out the command, communicating to the Reader hardware through a serial line or other medium. While it is carrying out the command, the Reader produces several messages. First, it produces a status message when it starts carrying out the command; the message, in essence, says that the Reader is now busy carrying out the command. The status module receives this message and displays the information for the user. Later, when the Reader has finished reading the plate, it sends out a data message with the data that it has gathered. The Data Logger receives the data and logs it to a file or places it in a database. The Reader also sends out a status message to the effect that it is no longer busy; again, the Run-Time Status module picks the message up and displays the information for the user. Finally, the Reader sends out the command completion message which the Executive has been waiting for. The Executive receives the message and continues on to the next command.

It should be noted that any of the modules in this system could be replaced if the functions needed by the system change. Clearly, one could not replace the Reader module with a Data Logger; the Data Logger has a different functionality set. Here is where the system designer must figure out what functionality is needed, and which modules will provide it. For instance, if a user wanted data logged to a database, a flat file, and a remote Internet site, the system designer need only add the modules that provide this functionality. The rest of the system is untouched and unaware of the change.

The Messaging Control

The Messaging Control (an OCX) comprises a common message handing control that provides the module writer with a means to communicate with other modules via messages. (A "message" as used herein and in the claims, is a hierarchically organized collection of string-value pairs. When a software module sends a message to an instance of an software object, the module decodes the message and performs the appropriate action. Generally, this action is to call one of the object's methods.) communication between executing software programs which is used to facilitate the execution of the software program. A software message is not, for example, a message sent via email.) The control has functions that allow the module writer to create messages, place data in messages, send out messages, request messages and save messages for later use. It also includes an event that is triggered when a previously requested message arrives.

In one embodiment, the software system is a modular system, and modules do not generally worry about exactly which modules receive their messages. For instance, a reader module will produce data, but it does not necessarily care where it goes. Similarly, the Reader does not have to care where its command messages come from. These decisions will be made by the person putting together a system; one might decide that the data from a particular module is of no use, or conversely, decide that it should be sent to several different modules. The Messaging Control, along with the Keeper module, allow for this.

The present system can be analogized to writing a letter and then giving it to your personal postal worker, telling him, "Send this to my relatives." Now, this postal worker has been given information as to who your relatives are, and he can make copies of the letter and put an address label on each one; he can then put them in the mail and be assured that they will arrive in the hands of the appropriate people. Perhaps at some point in the future, the set of people termed "my relatives" changes (someone marries into the family). It is your personal postal worker's responsibility to realize that fact and the next time you send a letter to "my relatives" he will include the new person in the mailing. Similarly, if someone dies in the family, your personal postal worker does not send him any more letters.

The Router is analogous to the Post Office and the Messaging Control is analogous to the personal postal worker. The Messaging Control gets directions on where to send messages from the Keeper module (a central record keeping module). In one embodiment, each module in the system has a branch in the Keeper registry with a number of different leaves that come off of it; modules of the same type (e.g., two MultiPette modules) do not share a branch. Each has its own. One of these leaves (%Messaging) is set aside to hold message translations. This Messaging Control uses these message translations to take the name that you use (e.g., "My Relatives") and translate it into an address that the Router (the post office) uses to get the message to all the appropriate parties.

Some representative entries in a %Messaging leaf node are as follows:

Data=*:*:%MN:%MT:Device Data
Device Command=%MN:%MT:*:*:Device Command
Device Command Reply=%RN:%RT:*:*:Device Command Reply In one embodiment, the entries, called "message translations" are in the form:

| translation = name | message : attribute 1 | message : attribute 2 | message : attribute 3 | message : attribute 4 | message attribute 5 |
| --- | --- | --- | --- | --- | --- |

For example:
<Translation Name>=<To Name>:<To Type>:<From Name>:<From Type>:<Msg Type>

The message Translation Name is the name that the module writer uses to refer to that message translation (i.e. type of message). The "message attributes," (fields) on the right specify message characteristics, such as the addressing information; this is the kind of addressing information that the Router accepts. This includes, for example, the name and type of the module that the message is intended for, the name and type of the module that is sending the message and finally, a message type. The message type tells what is in the message (data, a command, status info, etc.). Note the fact that while one might address a message for a particular module, any module can request that message and receive it. In a similar way, the return address (the from name and from type) can be anything; they do not necessarily need to refer to the module that actually sent the message (e.g., impersonation of a module is possible).

When a module is requesting a message, the * character means "matches anything." The translation EveryMessage= *:*:*:*:*, when requested, will match every message in the system. It is important to note that, in the preferred embodiment, when sending a message, the * character does not mean "matches everything". Instead, it is simply interpreted as a star character.

%MN is a macro and refers to the module's own name ("current Module Name"). %MT refers to the module's type ("current Module Type"). These two are for convenience; they can just as easily be replaced by the actual name and type. %RN and %RT are a little different. They refer to the name and type of the module that is being replied to ("Reply to Name" and "Reply to Type"). That is, in one embodiment, when a module receives a command and wants to reply back to the sender of the command, these two fields get filled in by the Messaging Control with the "From Name" and "From Type" fields of the message being replied to. When a module gets a message that it will want to reply to, it tells the Messaging Control to save it; the Messaging Control will give the module a number that identifies the saved message. Later, when the module writer wants to reply, he can simply hand that number to the Messaging Control along with the message name to reply with. This "macro" capability makes it easier for a programmer to specify message characteristics.

When the Messaging Control receives a message, it searches the list of translations for one that matches; it starts from the bottom of the list and goes up. The first requested translation that matches is the only one used when receiving a message; translations which are not requested or which are ignored are always skipped in this search.

If two translations have exactly the same set of fields on the right side of the equal sign, then the translation names are essentially aliases for each other. If you request one, it has exactly the same effect as requesting the other. Ignoring one has exactly the same effect as ignoring the other. Although this should not cause run-time problems, having translations with exactly the same set of fields on the right side of the equal sign can be confusing and is not recommended.

The Messaging Control

The Messaging Control shields the module writer from the details of exactly how messages are passed. All that a user of the control needs to know is that when a new message arrives, the RcvMsg event will fire. At that time the programmer can get information out of the message, which is formatted according to a common message address format, using methods of the Messaging Control. A message can contain strings and other messages. Accordingly, a message may comprise a tree with strings being leaf nodes and sub-messages being branches. When a message is received, its root level is the current message. To get strings (data values) from the current message use GetString, providing a zero (0) as the message Id (identifying the current message) and a key string that identifies which string to retrieve. The Messaging Control will parse the message and retrieve the message data value associated with the key, regardless of the physical sequence of the data value in the message. base To get a sub-message use GetSubmsg, again providing a zero (0) as the message Id and a key string identifying the sub-message; this method will return a number identifying the sub-message. This number can then be used to identify the sub-message in calls to the various methods of this OCX (e.g., wherever IMsgID is used as a parameter). This ability to use extract message contents (sub-messages) using a key string, such that a sub-message can be extracted regardless of its physical sequence in the message, is the essence of the "common message format" of the present invention. As noted above, in one embodiment, the sub-messages are extractable from a tree format, although it is not mandatory that a tree format be used. Root messages and sub-messages are treated exactly the same (an ID for either type in most methods may be provided) except when it comes to deletion. A root message is one which is not a sub-message of any other message. When one deletes a root message using DeleteMsg all of its sub-messages are also deleted. To get rid of a sub-message, use RemoveKey.

In one embodiment, the naming of modules, keys and message translations are limited in the following ways:

Module names and module types may contain any character except \ (backslash), null, | (vertical bar), #, carriage return, or linefeed, but they may not be the single character * (asterisk). In addition, they may not begin with % (percent sign).

Keys may contain any character except null, | (vertical bar), \ (backslash), carriage return, and linefeed. In addition, only system defined keys may begin with a % sign (this is a convention).

Message translation names may contain any character except null, | (vertical bar), : (colon), #, carriage return, or linefeed, but they may not be the single character * (asterisk). In addition, only system defined translations may begin with a % sign.

In general, the characters to avoid are: \, null, |, #, %, carriage return, linefeed, and *.

When communicating with a specific module (as opposed to broadcasting), it is important that a module know that its messages were in fact received by intended recipient module. For instance, when the Executive sends a command to a module it is important that the Executive know that the message arrived; if it does not arrive, it is possible that the module is malfunctioning. To simplify this, the Messaging Control supports return receipts. A field (%Return) in the outgoing message is added that specifies the message type that should be used as a return receipt; when the message arrives, the Messaging Control of the receiving module will detect that this field is in the root of the message and send an immediate reply. The sending module will wait for this reply, timing out if it takes too long. Most of the time, return receipts are not needed since the system modules do not usually care where their messages go. When they are needed, the Messaging Control property "bConfirmDelivery" should be set to True. The next send command will automatically add the %Return field and wait for the reply. If the Messaging Control property bAutoResetConfirmationOnSend is True (the default) the "bConfirmDelivery" property will automatically get set to False again after the send command.

To facilitate the saving of messages to disk or other media, the GetMsgAsStringV and LoadMsgFromStringV methods are provided. They allow one to serialize a message into a variant safe array of bytes. This array can then be written to disk and later reloaded. This is only provided to allow for the saving of messages; one should not attempt to parse the information because the format may change. Modifying the string will have unpredictable results.

Strings contained in messages may have embedded nulls (to allow for binary data); all OLE strings are passed with a length prefix, allowing one to avoid using a null terminator. Care should be taken when using C++ because almost all C string operations assume a null terminated string; this includes the wrappers for OLE controls made by VC++. When including binary data in a message, it is recommended that the V method be used rather than AddString. AddStringV allows the data to be passed in as a variant safe array of bytes rather than a length-prefixed string. It will be appreciated that AddString and AddStringV comprise software means for building a message to be sent, such that the keys and their associated data values may be inserted into a message in any order. The sequence of the data values is dynamically constructed during execution of the software system. Accordingly another software module decoding a received message need only supply the key associated with the desired data value, and the data value may be retrieved (e.g., by the GetString method) regardless of the physical order the data value may be within the message.

System keys exist off of the root of messages and are named starting with a % (percent sign).

The %Return string field is added to a message when the sender wants a return receipt. It contains the message type to use when sending the return receipt. The ToName and ToType fields of the return receipt should be set to the FromName and FromType fields of the original message as well. These fields are automatically used by the OCX. If the bAutoConfirm property is set to False, it is up to the module to examine this field and generate return receipts as appropriate.

In an incoming message, this %Address sub-message has a key for each part of the address of the message: ToName, ToType, FromName, FromType and MsgType. When sending a message, in very rare cases one might want to override a translation; to do this, the %Address sub-message should be created, and a Override sub-message should be created under it. Within the Override sub-message, any fields to be overridden should be included (e.g., ToName, FromType, etc.).

When a message is sent, the sending Messaging Control will place a timestamp (%Time Stamp) at the root of the message. The timestamp is a 64 bit floating point number that is converted to a string. Days are represented by whole number increments starting with Dec. 30, 1899, midnight as time zero. The is the standard OLE date form; products such as Excel and Access will be able to convert this value into a human readable date and time.

Programming Examples

The following examples are be presented using Object Pascal (Delphi) syntax and Visual Basic syntax. It is assumed that a Messaging Control OCX object exists and is named "SILAS".

Registering

Once the Messaging Control has been created, registering a module is done by calling RegisterModule with a name and type. The name should be one that is in the Keeper registry. Modules are often given a name on the command line when the Keeper launches them; the type is generally hard-coded into the module.

Delphi Example

{The first command line parameter is ParamStr(1) in Delphi then call RegisterModule}
SILAS.RegisterModule(ParamStr(1),'Device');

Visual Basic Example

'Get the entire command line with the Command$ function in VB.
CmdLn$=Command$
'Getting the first command line parameter is a little harder with 'VB because no built-in parser for the command line exists. The 'following example function can be used to parse the command line.

```
Function ParseCommand(tokenNum As Integer, cmd$) As String
    Dim i, tokN As Integer
    Dim c$, tok$
    i=1: tokN=0: c$="": tok$ =""
    While i<=Len(cmd$)
        c$=Mid(cmd$, i, 1)
        While c$<>"" And c$<>vbTab And i<=Len(cmd$)
            tok$ =tok$ & c$
            i=i+1
            c$=Mid(cmd$, i, 1)
        Wend
        tokN=tokN+1
        If tokN=tokenNum Then
            ParseCommand=tok$
            Exit Function
        Else
            tok$=""
            i=i+1
        End If
    Wend
    ParseCommand=""
End Function
```

'Call ParseCommand to get first parameter, then register with it SILAS.RegisterModule(ParseCommand(1, CmdLn$), "Device").

Once the Messaging Control is registered, it will attempt to talk to the Keeper module to get the message translations for this module. Once it is successful or has given up, the Initialized event will fire. Nothing else involving SILAS should be done until this event fires. One should check both the return value of the RegisterModule call, and the ISuccess parameter of the Initialized event. If either is negative, then an error has occurred.

When the module is done working in SILAS it should call UnregisterModule to unregister. The module may continue to manipulate message after calling this function, but it should not send, request, ignore or receive any messages.

Requesting and Ignoring Messages

In order to get any messages from other modules, a module must first request them. This is done by a call to RequestMsg with the name of the message translation that corresponds to the messages you want:

Delphi Example if SILAS.RequestMsg('Data')>0 then
    {The message translations in the registry must be messed up—fatal error}

Similarly, once you no longer want a particular message one needs to tell the Messaging Control OCX to ignore it:

if SILAS.IgnoreMsg('Data')>0 then
    {The message translations in the registry must be messed up—fatal error}

Visual Basic Example

If SILAS.RequestMsg("Data")>0 Then
    'The message translations in the registry must be messed up—'fatal error Similarly, once you no longer want a particular message one needs to tell the Messaging Control OCX to ignore it:

If SILAS.IgnoreMsg("Data")>0 Then
    'The message translations in the registry must be messed up—'fatal error When the Messaging Control OCX receives a message, it searches the list of translations for one that matches; it starts from the bottom of the list and goes up. The first requested translation that matches is the only one used when receiving a message; translations which are not requested or which are ignored are always skipped in this search.

Receiving a Message

Once a module has requested a message, the RcvMsg event may fire at any time to inform the module that a message has arrived:

Delphi Example

```
procedure TfrmMain.RcvMsg(Sender: TObject;
    const sMsgName: string);
begin
    {Find out what kind of message it is}
    if sMsgName='Existence Query' then
        begin
            ... {do something with it}
        end
    else if sMsgName='Data' then
        ...
end;
```

Visual Basic Example

```
Private Sub SILAS_RcvMsg(ByVal sMsgName As
    String)
    'Find out what kind of message it is
    If sMsgName="Existence Query" Then
        ... 'do something with it
    ElseIf sMsgName="Data" Then
        ...
    End If
End Sub
```

Getting Strings from the Current Message

All data in a message is retrieved by providing a key that identifies it:

Delphi Example

```
{Get the command name from the current message
    (identified by 0)}
sCommandName:=SILAS.GetString(0,'Command
    Name');
if sCommandName='Read' then
    {Perform the read}
```

Visual Basic Example

```
'Get the command name from the current message
    (identified by 0)
sCommandName=SILAS.GetString(0, "Command
    Name")
If sCommandName="Read" Then
    'Perform the read
```

If the key given is not in the message, an empty string is passed back. If you must differentiate between a missing key and empty strings, use the StringExists method.

Saving Messages

It is often useful to be able to save a message for later use (usually to reply to it):

In Delphi: ISavedMessage:=SILAS.SaveCurrentMsg( );

In Visual Basic: ISavedMessage= SILAS.SaveCurrentMsg

From that point on, one may refer to that message using the number supplied by the method (ISavedMessage). One may do anything with the saved message that can be done with the current message; simply use the number provided instead of 0, for example:

In Delphi:

sCommandName:=SILAS.GetString(ISavedMessage, 'Command Name');

In Visual Basic:

sCommandName=SILAS.GetString(ISavedMessage, "Command Name")

Working with Sub-messages

Messages can contain other messages (sub-messages). This is similar to a tree with branches (sub-messages) and leaves (strings); GetSubmsg is like looking at a branch:

In Delphi: ISubmessage:=SILAS.GetSubmsg(0, 'Parameters');

In Visual Basic: ISubmessage =SILAS.GetSubmsg(0, "Parameters")

Once a sub-message is gotten, one may simply treat it like any other message, for example:

In Delphi: sCommand:=SILAS.GetString(ISubmessage, 'Command Name');

In Visual Basic: sCommand =SILAS.GetString (ISubmessage, "Command Name")

If there are multiple levels of sub-messages, one needs to get each in turn; for instance, consider a message structured like so:

If one wanted to get the Wavelength parameter for Read Two, one would do this:

Delphi Example

```
IparamMsg:=SILAS.GetSubmsg(0,'Parameters');
IReadTwo:=SILAS.GetSubmsg(IParamMsg,'Read
    Two');
sReadTwoWavelength:=SILAS.GetString(IReadTwo,
    'Wavelength');
```

Visual Basic Example

```
IparamMsg=SILAS.GetSubmsg(0, "Parameters")
IReadTwo =SILAS.GetSubmsg(IParamMsg, "Read
    Two")
sReadTwoWavelength=SILAS.GetString(IReadTwo,
    "Wavelength")
```

Once a root message is deleted, its sub-messages will also be deleted, and the ID's used to reference them will be invalid. If one needs a sub-message later, but not its root message, create a blank message (CreateMsg) and copy the sub-message (CopyAll). At that point, the sub-message is its own root message and will stay around until explicitly deleted. To save the 'Parameters' sub-message of the above example, do the following:

In Delphi:

ISavedSubMsg:=SILAS.CreateMsg( );

SILAS.CopyAll(SILAS.GetSubmsg(0,'Parameters'), ISavedSubMsg);

In Visual Basic:

ISavedSubMsg=SILAS.CreateMsg

SILAS.CopyAll SILAS.GetSubmsg(0, "Parameters"), ISavedSubMsg

Building and Sending Messages

The Messaging Control OCX allows one to build up a message field by field and then send it. Here's how the message used above was created (error checking has been omitted):

Delphi Example

{create a new message}

IOutMsg:=SILAS.CreateMsg( );

{add the Command key with the string "Read" as the command}

SILAS.AddString(IOutMsg, 'Command','Read');

{Create the Parameters sub-message}

IParamsMsg:=SILAS.AddSubmsg(IOutMsg, 'Parameters');
{create Read One sub-message}
IReadOne:=SILAS.AddSubmsg(IParamsMsg,'Read One');
{Add data to Read One}
SILAS.AddString(IReadOne,'Wavelength','450');
SILAS.AddString(IReadOne,'Dispense','False');
{create Read Two sub-message}
IReadTwo:=SILAS.AddSubmsg(IParamsMsg,'Read Two','True');
{Add data to Read Two}
SILAS.AddString(IReadTwo,'Wavelength','950');
SILAS.AddString(IReadTwo,'Dispense?','True');

Visual Basic Example
  'create a new message
  IOutMsg =SILAS.CreateMsg
  'add the Command key with the string "Read" as the command
  SILAS.AddString IOutMsg, "Command", "Read"
  'Create the Parameters sub-message
  IParamsMsg =SILAS.AddSubmsg(IOutMsg, "Parameters")
  'create Read One sub-message
  IReadOne =SILAS.AddSubmsg(IParamsMsg, "Read One")
  'Add data to Read One}
  SILAS.AddString IReadOne, "Wavelength", "450"
  SILAS.AddString IReadOne,"Dispense", "False"
  'create Read Two sub-message
  IReadTwo =SILAS.AddSubmsg(IParamsMsg, "Read Two", "True")
  'Add data to Read Two
  SILAS.AddString IReadTwo, "Wavelength", "950"
  SILAS.AddString IReadTwo,"Dispense?", "True"

After the message is built, sending it is just a matter of specifying where it needs to go (note that 'Command' in this example refers to a translation name, not a key or sub-message):
  In Delphi: SILAS.SendMsgTo(IOutMsg,'Command', 'SMax');
  In Visual Basic: SILAS.SendMsgTo IOutMsg, "Command", "Smax"

There are several different ways to specify where a message should go. The above method (SendMsgTo) addresses the given message directly to the module specified. This method is only used when it is unreasonable to have a translation for each module that the message will be sent to (e.g., an executive module has a single command translation and uses the SendMsgTo method to direct the messages to a particular module). If there are only a few different modules that need to be communicated with, the regular send method (SendMsg) is preferable because the translations can be changed without needing changes in the module. The final method of sending a message is in reply to another message (SendReply); this is the most often used method for device modules. All messages that the module produces in response to a command would be sent using this method (including Data, Events, Touches, Status, etc.). Generally, the only time that a device module will use SendMsg or SendMsgTo is if it is controlling a subordinate module or something happens spontaneously.

When one is done with messages that have been created or saved, one should delete them (using DeleteMsg). Messages created will remain until explicitly deleted. One does not need to delete sub-messages, because they will be deleted when their parent message is deleted. One also does not need to delete the current message, because it is automatically deleted at the end of the RcvMsg event; if you will need it later, save it (using SaveCurrentMsg).

Sending a reply message requires that one reply during the RcvMsg event (specifying the current message with a 0) or save the message and use that saved message number at some later time:

Delphi Example
  procedure TfrmMain.SilasRcvMsg(Sender: TObject; const sMsgName: string);
  var
    IOutMsg, ICommand: integer;
  begin
  {Find out what kind of message it is, i.e., which translation it first matches from the Keeper (remember bottom-up matching)}
  if sMsgName ='Existence Query' then
  begin
    {build a reply message that will be automagicly deleted}
    IOutMsg:=SILAS.CreateMsgToSend( );
    {Reply using 0 to specify the current message}
    SILAS.SendReply(IOutMsg, 'Existence Query Reply',0)
  end
  else if sMsgName='Command' then
    {it's a command—save it so we can reply when we're done}
    ICommand:=SILAS.SaveCurrentMsg( );
    . . . {finish looking for names we care about}
    . . . {finish doing whatever else this module may need to do}
  {After finishing the command, send a reply}
  SILAS.SendReply(IOutMsg, 'Command Reply', ICommand);
  {delete the command message}
  SILAS.DeleteMsg(ICommand);
end;

Visual Basic Example
  Private Sub SILAS_RcvMsg(ByVal sMsgName As String)
  Dim IOutMsg As Integer, ICommand As Integer
  'Find out what kind of message it is, i.e., which translation it
  'first matches from the Keeper (remember bottom-up matching)
  If sMsgName="Existence Query" Then
    'build a reply message that will be automagicly deleted
    IOutMsg=SILAS.CreateMsgToSend
    'Reply using 0 to specify the current message
    SILAS.SendReply IOutMsg, "Existence Query Reply", 0
  ElseIf sMsgName="Command" Then
    'it's a command—save it so we can reply when we're done
    ICommand=SILAS.SaveCurrentMsg
    . . . 'finish looking for names we care about
  End If
  . . . 'finish doing whatever else this module may need to do 'After finishing the command, send a reply
   SILAS.SendReply IOutMsg, "Command Reply", ICommand
   'delete the command message
   SILAS.DeleteMsg ICommand
End Sub Re-using Messages Sometimes it is useful to take parts of a message you have received and put them into a message that you are sending (e.g., send the whole command message to the event logger so it can handle it however it wants). It is also useful to re-use a message that will be sent repeatedly with small modifications (e.g., a status message). For this purpose there are several different ways to copy from one message to another:

Delphi Example

{Copy the whole current message to the outgoing message}
   SILAS.CopyAll(0, IOutMsg);
   {Copy a sub-message to the root of the outgoing message}
   SILAS.CopyAll(ISubMsg, IOutMsg);
   {Copy a single key from one message to another}
   SILAS.CopyTo(ISavedMsg, 'Command', IOutSubmsg, 'Command');

Visual Basic Example

'Copy the whole current message to the outgoing message
   SILAS.CopyAll 0, IOutMsg
   'Copy a sub-message to the root of the outgoing message
   SILAS.CopyAll ISubMsg, IOutMsg
   'Copy a single key from one message to another}
   SILAS.CopyTo ISavedMsg, "Command", IOutSubmsg, "Command"

Figure 2:
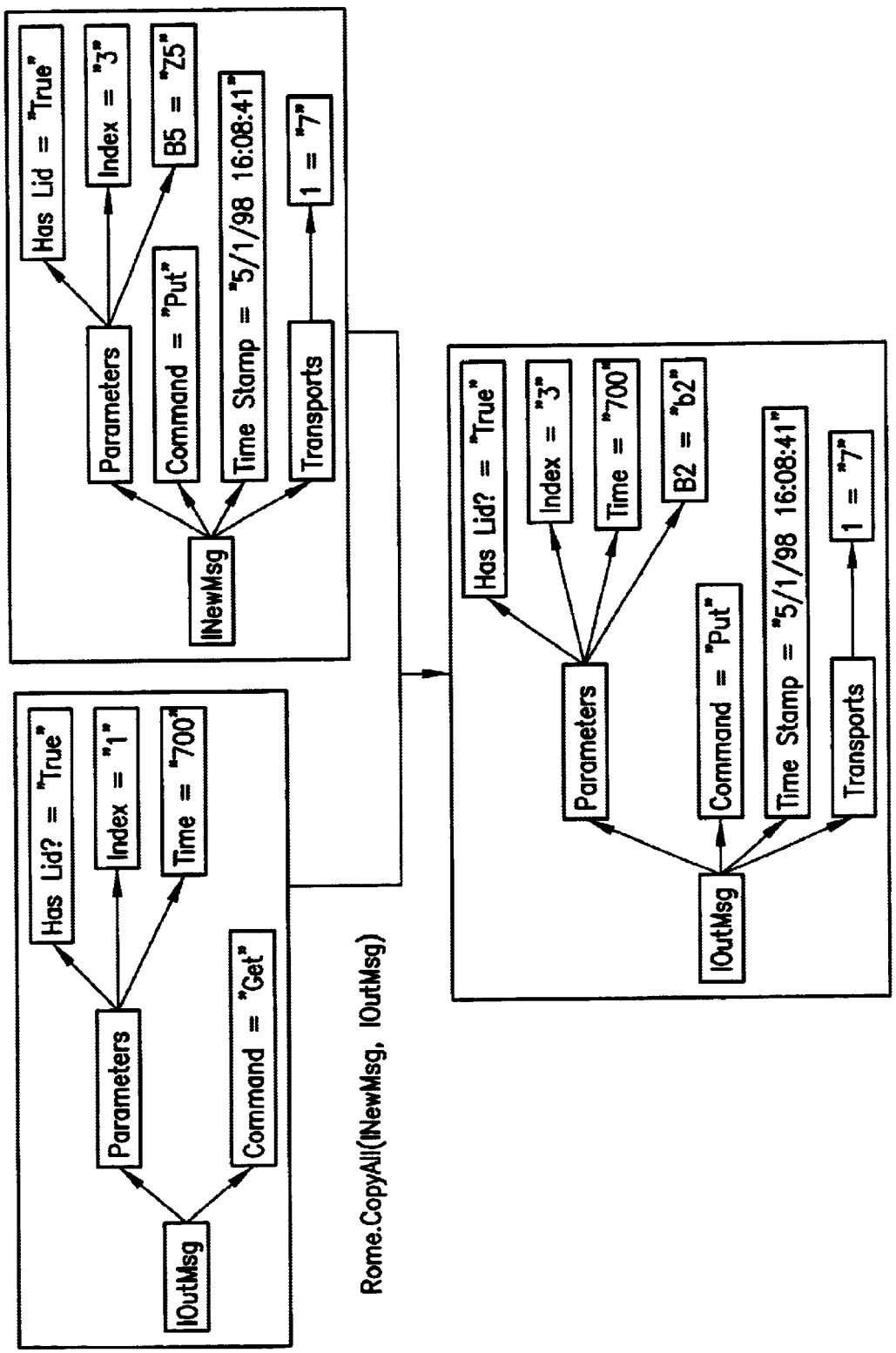
FIG. 2 illustrates the merging that occurs when CopyAll method of the Messaging Control is applied to two messages.

Note that if one copies a message onto another message, the two messages are merged; the string values of the source message will overwrite those of the destination message for all keys which are the same between the two messages. Keys which are unique to either message are not modified. FIG. 2 illustrates the merging that occurs when CopyAll is applied to two messages.

Enumeration

Sometimes one does not know what keys a message contains. In order to find out, you need to use the enumeration functions GetFirstStringPosition, GetNextStringKey, GetFirstSubmsgPosition, and GetNextSubmsgKey.

Delphi Example

IPos:=SILAS.GetFirstStringPosition(0);
   while IPos < >0 do
   begin
      sKey:=SILAS.GetNextStringKey(0, IPos); // IPos is updated here
      ... // do something with the key
   end;
   IPos:=SILAS.GetFirstSubmsgPosition(0);
   while IPos < >0 do
   begin
      sKey:=SILAS.GetNextSubmsgKey(0, IPos); // IPos is updated here
      ... // do something with the key
   end;

If you wanted to get all of the strings from a message, you could do something like this:

IPos:=SILAS.GetFirstStringPosition(0);
   while IPos < >0 do
   begin
      sKey:=SILAS.GetNextStringKey(0, IPos);
      sAllStrings:=sAllStrings+SILAS.GetString(0, sKey);
   end;
   ISubMsgPos:=SILAS.GetFirstSubmsgPosition(0)
   while ISubMsgPos < >0 do
   begin
      sSubMsgKey:=SILAS.GetNextSubmsgKey(0, ISubMsgPos);
      ISubMsgKey:=SILAS.GetSubmsg(0, sSubMsgKey);
      IPos:=SILAS.GetFirstStringPosition(ISubMsgKey);
      while IPos < >0 do
      begin
         sKey:=SILAS.GetNextStringKey(ISubMsgKey, IPos);
         sAllStrings:=sAllStrings+SILAS.GetString(ISubMsgKey, sKey);
      end;
   end;

Visual Basic Example

IPos=SILAS.GetFirstStringPosition(0)
   While IPos < >0
   sKey:=SILAS.GetNextStringKey(0, IPos) 'IPos is updated here
   ... 'do something with the key
   Wend
   IPos=SILAS.GetFirstSubmsgPosition(0)
   While IPos < >0
   sKey=SILAS.GetNextSubmsgKey(0, IPos) 'IPos is updated here
   ... 'do something with the key
   Wend If you wanted to get all of the strings from a message, you could do something like this:

IPos=SILAS.GetFirstStringPosition(0)
   While IPos < >0
   sKey=SILAS.GetNextStringKey(0, IPos)
   sAllStrings=sAllStrings & SILAS.GetString(0, sKey)
   Wend
   ISubMsgPos=SILAS.GetFirstSubmsgPosition(0)
   While ISubMsgPos < >0
   sSubMsgKey=SILAS.GetNextSubmsgKey(0, ISubMsgPos)
   ISubMsgKey=SILAS.GetSubmsg(0, sSubMsgKey)
   IPos=SILAS.GetFirstStringPosition(ISubMsgKey)
   While IPos < >0
   sKey=SILAS.GetNextStringKey(ISubMsgKey, IPos)
   sAllStrings=sAliStrings & SILAS.GetString(ISubMsgKey, sKey)
   Wend
   Wend Confirming Delivery Sometimes, when one sends a message it is important to be sure that it actually arrived; if the module you are sending the message to has failed for some reason, one does not want the module to crash. In one embodiment, the Messaging Control OCX automatically supports confirmation of deliveries. Since most messages do not require confirmed delivery, in one embodiment, the programmer must set a property (bConfirmDelivery) immediately before doing the send; the Messaging Control OCX will automatically reset it to False after you send the message:

Delphi Example

```
{Confirm delivery}
SILAS.bConfirmDelivery:=True;
{Send message—check return value; if nonzero, we timed
    out waiting for the return receipt (or some other error
    occurred)}
if SILAS.SendMsg(IMsgId,'SMax-Command') < >0 then
    {The SMax module must be dead!}
else
    {bConfirmDelivery has been automatically reset to
        false—we will not wait for a return receipt on this
        send}
    SILAS.SendMsg('Status');
```

Visual Basic Example

```
'Confirm delivery
SILAS.bConfirmDelivery=True
'Send message—check return value; if nonzero, we timed
    out 'waiting for the return receipt (or some other error
    occurred)
If SILAS.SendMsg(lMsgid, "SMax-Command") < >0
    Then
    'The SMax module must be dead!
Else
    'bConfirmDelivery has been automatically reset to
        false—we
    'will not wait for a return receipt on this send
    SILAS.SendMsg "Status"
End If
```

In one embodiment, calling SendMsg with bConfirmDelivery set to True can result in reentrancy if you receive a message or other event while the Messaging Control OCX is waiting for the delivery confirmation.

Modules that listen to messages not intended for them need to set the bAutoConfirm property to False. This must be done so that the module does not confirm delivery of a message not meant for it. Instead, the module should call SendDeliveryConfirmation for messages meant for it:

7.22.

```
if sMsgName='Command To Me' then
    begin
        SILAS.SendDeliveryConfirmation(0);
        . . .
    end
else if sMsgName='Commands for someone else' then
    // do not send the delivery confirmation here
    begin
        . . .
    end
else if sMsgName='Existence Query' then
    begin
        SILAS.SendDeliveryConfirmation(0);
        SILAS.SendReply(SILAS.CreateMsgToSend,
            'Existence Query Reply',0);
    end;
```

Visual Basic Example

```
If sMsgName="Command To Me" Then
    SILAS.SendDeliveryConfirmation 0
    . . .
ElseIf sMsgName="Commands for someone else" Then
    'do not send the delivery confirmation here
    . . .
ElseIf sMsgName="Existence Query" Then
    SILAS.SendDeliveryConfirmation 0
    SILAS.SendReply(SILAS.CreateMsgToSend,
        _"Existence Query Reply", 0)
End If
```

Errors and Exceptions

There are three levels of exceptions that the Messaging Control OCX may raise: Common, Rare and Fatal. There are three corresponding properties on the Messaging Control OCX: bRaiseExceptions, bRaiseRareExceptions, and bRaiseFatalExceptions. When bRaiseExceptions is set to True, Common errors will result in an exception being raised. If it is not set, then the error will be indicated by the return value of the method being called. The other two properties affect their associated set of errors in a similar manner. The exceptions raised will include a descriptive message indicating the nature of the error. When exceptions are turned off, the error text can be retrieved by calling GetErrorText with the error ID number.

Delphi Example

```
try
    SILAS.SendMsg(IMsg, 'Non-existent Translation');
except
    On xE : Exception do
        MessageDlg('Error encountered:'+xE.Message,
            mtError,[mbOK],0);
    end; {end of subroutine}
```

Visual Basic Example

```
On Error Goto ErrorHandler
    SILAS.SendMsg IMsg, "Non-existent Translation"
    Exit Sub
ErrorHandler:
    SilasMsgBox.SilasMsgBox "Error encountered:" & Str
        (Err.Number)_& " generated by " & Err.Source &
        vbCrLf & Err.Description,_vbOkOnly, "Error"
End Sub
```

Translations

Normally the Messaging Control OCX will retrieve all of its translations from the Keeper when it registers. However, if the bRetrieveTranslations property is set to False prior to registration, the Messaging Control OCX will not retrieve its translations from the Keeper. One must still wait for the Initialized event even if you are not retrieving translations. The method AddTranslation is provided for adding a single translation. Also, the method AddTranslations is provided for adding many at a time.

Delphi Example

```
SILAS.bRetrieveTranslations:=False;
SILAS. RegisterModule('AllWatcher', 'Watcher');
. . .
procedure OnSilasInitialized(Sender: Tobject; ISuccess:
    integer)
begin
    // add the command translation
    SILAS.AddTranslation('Command', '*', '*', '*', '*',
        'Command');
    // add the status and data translations—use a string
    // formatted as in the %Messaging branches of the
        keeper
    SILAS.AddTranslations('Status=*:*:*:*:Status'+
        #13#10+'Data=*:*:*:*:Data')
    . . .
end;
```

Visual Basic Example
    SILAS.bRetrieveTranslations=False
    SILAS.RegisterModule "AllWatcher", "Watcher"
    . . .
    Private Sub SILAS_lnitialized(ByVal ISuccess As Long)
        'add the command translation
        SILAS.AddTranslation "Command", "*", "*", "*", "*", "Command"
        'add the status and data translations—use a string
        'formatted as in the %Messaging branches of the keeper
        SILAS.AddTranslations "Status=*:*:*:*:Status" & vbCrLf & _"Data=*:*:*:*:Data"
        . . .
    End Sub Also, the module can verify that it has a translation by calling TranslationExists. For instance, a device module will have code similar to the following in its Initialized event:

Delphi Example
    if SILAS.TranslationExists('Command')=0 then
        {raise custom exception (assumed to be already defined)}
        Raise EMissingTranslation.Create('Translation Command is missing.');

Visual Basic Example
    If SILAS.TranslationExists("Command")=0 Then
        'raise raw exception (could define an exception creator)
        Err.Raise 1001, App.Title, "Translation Command is missing."

Addressing Information

The address attached to a particular message is held in a sub-message off of the root called "%Address". Generally, this information is not needed; the OCX will provide one with the name of the message in the RcvMsg event. The set of names of messages that a module will receive will not change, but the individual elements of the address may (depending on how a system integrator decides to connect modules together).

The address components are found under the following keys under the %Address sub-message (no spaces between words): ToName, ToType, FromName, FromType, and Msg-Type Streaming Messages (e.g. file I/O)

Messages can be converted into a stream of bytes so that they can be saved to disk or sent over communications media other than the SILAS router.

Delphi Example

To write a message to a stream, use code similar to the following:

procedure WriteMsg(Stream: TStream; nMsg: integer);
    var
        vCodeMsg: variant;
        nCodeMsgSize: integer;
        pVarBuffer: pointer;
    begin
        // get the message as a variant
        vCodeMsg:=SILAS.GetMsgAsStringV(nMsg);
        // get the size and put it into the stream first
        nCodeMsgSize:=VarArrayHighBound(vCodeMsg, 1)-VarArrayLowBound(vCodeMsg, 1)+1;
        pVarBuffer:=VarArrayLock(vCodeMsg);
        WriteInteger(Stream, nCodeMsgSize);
        // write out the message and clean up
        Stream.WriteBuffer(pVarBuffer^, nCodeMsgSize);
        VarArrayUnlock(vCodeMsg);
        VarClear(vCodeMsg);
    end;

To read a message in, use code similar to the following:

function ReadMsg(Stream: TStream): integer;
    var
        nSize: integer;
        vMSg: variant;
        pVarBuffer: pointer;
    begin
        // get the message size
        ReadInteger(Stream, nsize);
        if nSize < >0 then
        begin
            // make an array of the appropriate size
            vMsg:=VarArrayCreate([0, nSize-1],varByte);
            pVarBuffer:=VarArrayLock(vMsg);
            // read the message into the buffer
            Stream.ReadBuffer(pVarBuffer^, nsize);
            VarArrayUnlock(vMsg);
            // pass the buffer to SILAS
            Result:=SILAS.LoadMsgFromStringV(vMsg);
            VarClear(vMsg);
        end
        else
            Result:=-1;
    end;

Visual Basic Example

Since Visual Basic does not have streams, file input and output is used for this example. Substantially different code may be needed for other applications.

To write a message to a file, code similar to the following may be used:

Public Sub WriteMsg(File As String, nMsg As Long)
    Dim pFile As Integer, Location As Integer
    Dim vCodeMsg( ) As Byte
    'Get a free file pointer and open the file
    pFile=FreeFile: Open File For Binary As pFile
    'Read message as a string (byte array)
    vCodeMsg=SILAS.GetMsgAsStringV(nMsg)
    'Loop through the entire array, putting each byte into the file
    For Location=LBound(vCodeMsg) To UBound (vCodeMsg)
        Put pFile, vCodeMsg(Location)
    Next Location
    Close pFile 'Close the file
    End Sub To read a message in from a file, use code similar to the following:

Public Function ReadMsg(File As String) As Long
    Dim pFile As Integer, Location As Integer, Char As Byte
    Dim MsgByteArray( ) As Byte
    'Get a free file pointer and open the file
    pFile=FreeFile: Open File For Binary As pFile
    'Initialize variables, assuming 0-based array indexing
    Location=0: Char=255
    'While we're not at the end of the file . . .
    While Location <LOF(pFile)
        'Get the next byte (auto-updates file position)
        Get pFile, Char
        'Make room for the new byte in the array
        ReDim Preserve MsgByteArray(Location +1)

```
'Put the byte into the array
MsgByteArray(Location)=Char
'Update the index to match position in the file
Location=Loc(pFile)
Wend
Close pFile 'Close the file
'load message into SILAS and return the message number
ReadMsg = SILAS.LoadMsgFromStringV
    (MsgByteArray( ))
End Function
```

Explanation of Prototypes

Events and methods presented below are pseudocode prototypes. The format is:

<return-type><name>(<parameter-type><parameter>,...)

The types and their language-dependent forms are summarized in the table below:

| Pseudocode Type | Delphi Type | VB Type |
|---|---|---|
| string | string | String |
| integer | integer | Integer |
| long | integer | Long |
| long* | pointer | Long |
| variant | variant | Variant OR Array |

The passing style of parameters is not specified in the pseudocode; the passing style will be obvious to one skilled in the art when using the methods or events in a particular programming environment (i.e. VB or Delphi).

Events
  RcvMsg
    RcvMsg(String sMsgName)
    Purpose
      This event occurs each time a SILAS message arrives. It is during the processing of this event that there is a "current message." Methods will operate on this message if the message id parameter is set to 0.
    Parameters

| sMsgName | The name of the message that just arrived. Corresponds to the name on the left side of a message translation. |
|---|---|

Initialized
    Initialized(long lSuccess)
    Purpose
      After a module calls RegisterModule and the OCX finishes initializing, this event will fire.
      Note: No other SILAS interaction should take place until this event has fired.
    Parameters

| LSuccess | Indicates whether the module has successfully initialized or has failed to initialize. when < 0 an error has occurred when = 0, the module has been initialized correctly |
|---|---|

Properties
  The properties marked as Run-Time Only will reset to their default values when SILAS is initialized; setting these properties as design-time will have no effect. bAutoConfirm
    When this property is set, the OCX will automatically send a return receipt when a message arrives with a non-empty %Return field. If this is set to False, it becomes the module's responsibility to send return receipts. It is useful to have this property False if your module will be listening in on conversations between other modules; if this property were True the sending module might end up getting a return receipt from the listening module rather than the intended module. Defaults to True.
  bAutoResetConfirmationOnSend—Run-Time Only
    When this property is True, the OCX will automatically set the bConfirmDelivery property to False after a message is sent. Defaults to True.
  bConfirmDelivery—Run-Time Only
    When this property is True the OCX will automatically request and wait for a return receipt when you send a message. Defaults to False.
  iConfirmTimeout
    This property determines how long the OCX will wait for a return receipt in seconds. Defaults to 15.
  bRetrieveTranslations—Run-Time Only
    When True, the OCX automatically retrieves its translations from the Keeper. Defaults to True.
  bRaiseExceptions—Run-Time Only
    When True, the OCX will raise OLE dispatch exceptions when a common error occurs. See Error Codes for the list of errors. Defaults to False.
  bRaiseFatalExceptions—Run-Time Only
    When True, the OCX will raise OLE dispatch exceptions when a fatal error occurs. See Error Codes for the list of errors. Defaults to True.
  bRaiseRareExceptions—Run-Time Only
    When True, the OCX will raise OLE dispatch exceptions when a rare error occurs. See Error Codes below for the list of errors. Defaults to True.

Methods
  AddString
    long AddString(long lMsgID, string sKey, string sData)
    Purpose
      This method adds a string to the given message under the given key.
    Parameters

| lMsgID | Indicates the message to add a string to |
|---|---|
| sKey | The key to the string |
| sData | The string to add |

Return Value
    Nonzero on failure, 0 on success.
  AddStringV
    long AddStringV(long lMsgID, string sKey, variant vString)
    Purpose
      This method adds a string to the given message under the given key. This method is provided to allow the client to transmit binary data. This is done by packing the data into a variant array of bytes (vString).

Parameters

| | |
|---|---|
| lMsgID | Indicates the message to add a string to |
| sKey | The key to the string |
| vString | The data to add. Must be a variant array of bytes (VT_UI1) |

Return Value

Nonzero on failure, 0 on success.

AddSubmsg long AddSubmsg(long lMsgID, string sKey)

Purpose

This method creates a sub-message under the given key in the given message. If a sub-message already exists with the given key, this method will return the ID of the pre-existing sub-message.

Parameters

| | |
|---|---|
| LmsgID | Indicates which message to add to |
| Skey | Indicates what key to put the new sub-message under |

Return Value

A number>0 to be used to refer to the message on success; Negative on failure.

AddTranslation long AddTranslation(string sTranslationName,
string sToName, string sToType,
string sFromName, string sFromType,
string sMsgType);

Purpose

This method is not for normal use; translations should all be held in the Keeper and automatically retrieved by the OCX. This method adds a new message translation to the list of translation held by the OCX; these translations work exactly like those held in the registry (see The Messaging Control)

Parameters

| | |
|---|---|
| sTranslationName | The name to be used to refer to the translation. |
| sToName | Name of the addressee |
| sToType | Type of the addressee |
| sFromName | Name of the sender |
| sFromType | Type of the sender |
| sMsgType | The type of message |

Return Value

'Nonzero on failure, 0 on success.

AddTranslations long AddTranslations(string sTranslations)

Purpose

This method is not for normal use; translations should all be held in the Keeper and automatically retrieved by the OCX. This method adds new message translations to the list of translation held by the OCX; these translations work exactly like those held in the registry Parameters

| | |
|---|---|
| sTranslations | The translations to add in the same format as found in the % Messaging branches of the Keeper. |

Return Value

Nonzero on failure, 0 on success.

AddUniqueString long AddUniqueString(long lMsgID, string sKey, string sData)

Purpose

This method adds a string to the given message under the given key. The OCX will assume that the string is not already present. This method is slightly faster than AddString when there are a small number of keys (<10) in the message. If the string is not unique, then there is no gaurantee which value will be returned when the key is later queried.

Parameters

| | |
|---|---|
| lMsgID | Indicates the message to add a string to |
| sKey | The key to the string |
| sData | The string to add |

Return Value

Nonzero on failure, 0 on success.

AddUniqueSubmsg long AddUniqueSubmsg(long lMsgID, string sKey)

Purpose

This method creates a sub-message under the given key in the given message. The OCX will assume that the submsg is not already present. This method is slightly faster than AddSubmsg when there are a small number of keys (<10) in the message. If the submsg is not unique, then there is no gaurantee which sub-message will be returned when the key is later queried.

Parameters

| | |
|---|---|
| lMsgID | Indicates which message to add to |
| sKey | Indicates what key to put the new sub-message under |

Return Value

A number >0 to be used to refer to the message on success; Negative on failure.

CreateMsg long CreateMsg( )

Purpose

This method creates a new, blank message.

Parameters

None.

Return Value

A number >0 to be used to refer to the message on success; Negative on failure.

CreateMsgToSend long CreateMsgToSend( )

Purpose

This method creates a new, blank message. This message will be automatically deleted by the OCX once it is sent.

Parameters
None.
Return Value
A number >0 to be used to refer to the message on success; Negative on failure.

CopyAll
long CopyAll(long IFromID, long IToID)
Purpose
This method copies the full contents (including sub-messages) of one message to another.
Parameters

| IFromID | Indicates which message to copy from |
| IToID | Indicates which message to copy to |

Return Value
Nonzero on failure, 0 on success.

CopyKey
long CopyKey(long IFromID, string sKey, long ITOID, string sNewKey)
Purpose
This method copies the given key of one message to another. If there is a string and sub-message key with the same name, both will be copied.
Parameters

| IFromID | Indicates which message to copy from |
| sKey | The key to copy |
| IToID | Indicates which message to copy to |
| sNewKey | Indicates what key to put the data into. |

Return Value
Nonzero on failure, 0 on success.

CopyMsgToKey
long CopyMsgToKey(long IMsgID, long IToID, string sNewKey)
Purpose
This method copies the given message to a key under another message.
Parameters

| IMsgID | Indicates which message to copy from |
| IToID | Indicates which message to copy to |
| sNewKey | Indicates what key to put the data into. |

Return Value
Nonzero on failure, 0 on success.

DeleteMsg
long DeleteMsg(long IMsgID)
Purpose
This method deletes the given message (and all of its sub-messages). If the message ID refers to a sub-message this method will return an error. Only root messages may be deleted with this method. If you wish to delete a sub-message, use RemoveKey.
Properties

| IMsgID | Indicates the message to delete. Should not refer to a sub-message |

Return Value
Nonzero on failure, 0 on success.

GetErrorText
string GetErrorText(long IErrorID)
Purpose
This method retrieves the error text associated with a given error ID.

GetFirstStringPosition
long GetFirstStringPosition(long IMsgID)
Purpose
This method retrieves an integer that identifies the first string key in the given message. This number can then be passed to GetNextStringKey to retrieve the key.
Parameters

| IMsgID | Indicates which message to enumerate. |

Return Value
0 on failure or if there are no strings. Nonzero on success.

GetFirstSubmsgPosition
long GetFirstSubmsgPosition(long IMsgID)
Purpose
This method retrieves an integer that identifies the first submsg key in the given message. This number can then be passed to GetNextSubmsgKey to retrieve the key.
Parameters

| IMsgID | Indicates which message to enumerate. |

Return Value
0 on failure or if there are no submsgs. Nonzero on success.

GetNextStringKey
string GetNextStringKey(long IMsgID, long* IpEnumPosition)
Purpose
This method retrieves the next string key in the specified message and sets the given position integer to refer to the next key. The position integer will be set to 0 when there are no more keys.
Parameters

| IMsgID | Indicates which message to get a key from. |
| IpEnumPosition | Points to the position variable that refers to the key to get. This variable will be updated to refer to the next key when this | method returns successfully. If there are no more keys, it will be set to 0.

Return Value
The key on success; an empty string on error.

GetNextSubmsgKey
string GetNextSubmsgKey(long IMsgID, long* IpEnumPosition)
Purpose
This method retrieves the next submsg key in the specified message and sets the given position integer to refer to the next key. If there are no more keys, the position integer will be set to 0.
Parameters

| IMsgID | Indicates which message to get a key from. |
| IpEnumPosition | Points to the position variable that refers to the key to get. This variable will be updated to refer to the next key when this method returns successfully. If there are no more keys, then this variable will be set to 0. |

Return Value
The key on success; an empty string on error.

GetMsgAsStringV
variant GetMsgAsStringV(Iong IMsgID)
Purpose
This method returns a full message in a variant array of bytes. This method is meant only to be used so that the user may save messages to disk or other media; you should not examine or modify the contents of the array.
Parameters

| IMsgID | A number indicating which message to get. |

Return Value
The data on success; an empty variant on failure.

GetParentMsg
long GetParentMsg (long IMsgID, long pIParentID)
Purpose
This method returns the ID of the parent of the given message in the parameter pIParentID.
Parameters

| IMsgID | A number indicating which message to get the parent of. |
| pIParentID | The variable to hold the ID of the parent. |

Return Value
The 0 on success. Non-zero on failure (e.g. IMsgID is a root message).

GetString
string GetString(long IMsgID, string sKey)
Purpose
This method retrieves a string from a message.
Parameters

| IMsgID | A number indicating which message to get the string from. |
|  | 0 = the current message |
| sKey | Indicates which string to get. |

Return Value
The data on success; an empty string on failure.

GetStringV
variant GetStringV(long IMsgID, string sKey)
Purpose
This method retrieves a string from a message in the form of a variant array of bytes.
Parameters

| IMsgID | A number indicating which message to get the string from. |
|  | 0 = the current message |
| sKey | Indicates which string to get. |

Return Value
The data on success; an empty variant on failure.

GetSubmsg
long GetSubmsg(long IMsgID, string sKey)
Purpose
This method gets the ID of a sub-message under the given key in the given message. If the root message for this sub-message is deleted, the ID becomes invalid.
Parameters

| IMsgID | Indicates which message to retrieve from |
| sKey | Indicates what key to get the sub-message from |

Return Value
A number >0 to be used to refer to the message on success; Negative on failure . . .

IgnoreMsg
long IgnoreMsg(string sMsgName)
Purpose
This method turns off reception of the specified message.
Parameters

| sMsgName | Indicates which kind of message to stop receiving. |

Return Value
Nonzero on failure, 0 on success.

LoadMsgFromStringV
long LoadMsgFromStringV(variant vMsg)
Purpose
This method loads a message from a given variant array of bytes. This variant must have been previously provided by GetMsgAsStringV; any modification may cause unpredictable results.

Parameters

| vMsg | Contains the data returned previously by GetMsgAsStringV. |
|---|---|

Return Value
A number >0 to be used to refer to the loaded message on success;
Negative on failure.

ReadMsgFromFile
  long ReadMsgFromFile(string sFilePath)
    Purpose
      This method loads a message from a given file. The file must have been generated from a call to WriteMsgToFile or GetMsgAsStringV.
    Parameters

| sFilePath | Gives the path to the file to load. |
|---|---|

Return Value
A number >0 to be used to refer to the saved message on success;
Negative on failure.

RegisterModule
  long RegisterModule(string sName, string sType)
    Purpose
      This method registers the module with the SILAS kernel. This causes the Initialized event to fire. No other methods on this OCX should be called until the Initialized event has fired.
    Parameters

| sName | The name of the module. Must be unique in the system. |
|---|---|
| sType | The type of the module. |

Return Value
Nonzero on failure, 0 on success.

RemoveKey
  long RemoveKey(long lMsgID, string sKey)
    Purpose
      This method removes a key from a saved message; the key can specify a sub-message or a string.
    Parameters

| lMsgID | Indicates which message to remove the key from. |
|---|---|
| sKey | Indicates which key (and its associated data) to remove. |

Return Value
Nonzero on failure, 0 on success.

RequestMsg
  long RequestMsg(string sMsgName)
    Purpose
      This method requests that the given kind of message be sent to the module.

Parameters

| sMsgName | The name of the message to request |
|---|---|

Return Value
Nonzero on failure, 0 on success.

SaveCurrentMsg
  long SaveCurrentMsg( )
    Purpose
      This method saves the current message for later use. The current message number is changed as a side-effect; 0 no longer refers to the current message after it is saved with this method. Note that this message must be deleted (using DeleteMsg) when you are done using it.
    Return Value
    A number >0 to be used to refer to the message on success; Negative on failure.

SendDeliveryConfirmation
  long SendDeliveryConfirmation(long lMsgID)
    Purpose
      This method will send a delivery confirmation message in response to the given message if necessary (i.e., the message has a %Return field).
    Parameters

| lMsgID | Identifies the message for which a delivery confirmation should be sent. |
|---|---|

Return Value
Nonzero on failure, 0 on success.

SendMsg
  long SendMsg(long lMsgID, string sMsgName)
    Purpose
      This method sends the given message using the given translation name. It should only be used if the message is not caused by a previous message (such as a command); in that case, use SendReply instead.
    Parameters

| lMsgID | Identifies the message being sent. |
|---|---|
| sMsgName | The name of the address to put on the message |

Return Value
Nonzero on failure, 0 on success.

SendMsgTo
  long SendMsgTo(long lMsgID, string sMsgName, string sToName)
    Purpose
      This method sends the given message using the given translation name to the given module. Essentially, this function does the same thing as SendMsg, except that the ToName field of the translation will be replaced with sToName.

Parameters

| | |
|---|---|
| lMsgID | Identifies the message being sent. |
| sMsgName | The name of the address to put on the message |
| sToName | The name of the module that the message is meant for. This value is inserted into the ToName field of the message address. |

Return Value

Nonzero on failure, 0 on success.

SendReply long SendReply(long lMsgID, string sMsgName, long lSavedID)

Purpose

This method sends the given message using the given translation name in reply to the given message. This method should always be used when an output is caused by a particular message (usually a command or query).

Parameters

| | |
|---|---|
| lMsgID | Identifies the message being sent. |
| sMsgName | The name of the address to put on the message |
| lSavedID | The message that the outgoing message is in reply to. |

Return Value

Nonzero on failure, 0 on success.

String Exists long StringExists(long lMsgID, string sKey)

Purpose

This method checks for the existence of a string key under the given message. Use this to differentiate between a key with an empty string as its value and a key which is not there. (GetString does not make the distinction)

Parameters

| | |
|---|---|
| lMsgID | Indicates which message to check under |
| sKey | Indicates what key you are checking the existence of. |

Return Value

Returns 1 if the string was found. Retruns 0 if the string was not found.

Returns negative number on error.

Translation Exists long TranslationExists(string sTranslationName);

Purpose

This method checks to see if the given translation is in the set of translations currently loaded by the OCX. If bRaiseRareExceptions is set to True, then this method will raise an exception if the translation does not exist.

Parameters

| | |
|---|---|
| sTranslationName | Indicates what translation to check for. |

Return Value

If the translation exists, the return value is 1. If the translation does not exist, the return value is 0, unless bRaseRareExceptions is set to True, in which case an exception is raised.

UnregisterModule long UnregisterModule( )

Purpose

This method unregisters the module. After this method is called, the module will not receive messages.

Return Value

Nonzero on failure, 0 on success.

WaitFor long WaitFor(string sMsgName, integer lTimeout)

Purpose

This method waits up to lTimeout seconds for the given message to come in. Note that this method does not request the specified message, you must do that yourself before calling this method. In effect, this method does a ProcessMessages loop (DoEvents in Visual Basic) until the requested SILAS message comes in. While the loop is going on (the method has not returned), other events may occur (mouse clicks, SILAS messages, etc.). This means that if this method is called from the handler for the OnRcv event and a SILAS message comes in before the message you are waiting on, the OnRcv event handler will be reentrantly called. It is safe to call WaitFor reentrantly (i.e., in the middle of another WaitFor call).

The function will return after the given timeout occurs, even if the message has not been received. The function may not return immediately on timeout; the only guarantee is that if a timeout occurs, it will process no more than one message before returning. IMPORTANT: If WaitFor successfully returns, it changes the current message (ID=0) to the message that it was waiting for and just received.

NOTE: This function is for convenience in situations where there will be a very short wait; the same effect can be obtained without reentrancy by saving your state and exiting your event handler (when you are ready to wait). When the requested message comes in, the event handler will again be called and you can pick up where you left off.

Parameters

| | |
|---|---|
| sMsgName | The name of the message to wait for. |
| lTimeout | The maximum number of seconds to wait for the message. |

Return Value 0 if the message was received, 1 if it was not. Returns a negative value if the message name is invalid.

WriteMsgToFile
   long WriteMsgToFile(long lMsgID, string sFilePath)
      Purpose
         This method writes a message to a given file.
      Parameters

| | |
|---|---|
| lMsgID | The ID of the message to write out. |
| sFilePath | Gives the path to the file to load. |

Return Value
   0 on success, negative on failure.
Error Codes

| Constant | Code | Meaning |
|---|---|---|
| Common Errors | | |
| ERR_MSG_DOES_NOT_EXIST | −1 | The message ID given does not exist. |
| ERR_MSG2_DOES_NOT_EXIST | −2 | The seconds message ID given does not exist. |
| ERR_SUBMSG_DOES_NOT_EXIST | −3 | No sub-message exists under the given key. |
| ERR_MESSAGE_HAS_NO_PARENT | −4 | The given message has no parent message; it's a root message. |
| ERR_MODULE_NAME_IN_USE | −5 | The name that you tried to register under is in use by another module. |
| Rare Errors | | |
| ERR_CANT_DELETE_NON-ROOT_MSGS | −1000 | An attempt was made to call DeleteMsg on a non-root message. RemoveKey should be used to get rid of sub-messages. |
| ERR_TRANSLATION_NOT_FOUND | −1001 | The given translation name does not exist in the current set of translations. NOTE: Case matters! |
| ERR_NO_CURRENT_MSG | −1002 | An attempt was made to save the current message when there was none. |
| ERR_ALREADY_INITIALIZED | −1003 | An attempt was made to register while the module was already registered. |
| ERR_NOT_REGISTERED | −1004 | An attempt was made to execute a method that requires registration before the module has registered. |
| ERR_VARIANT_SHOULD_BE_A_SAFE_ARRAY | −1005 | All variants used by this OCX must be variant arrays of bytes. It will not attempt to coerce other types. |
| ERR_VARIANT_INCORRECTLY_STRUCTURED | −1006 | The variant has bad array bounds. |
| ERR_TRANSLATION_MISSING_TRANSLATION_NAME | −1007 | The translation name was not found in the translation. |
| ERR_TRANSLATION_MISSING_TONAME | −1008 | The ToName field was not found in the translation. |
| ERR_TRANSLATION_MISSING_TOTYPE | −1009 | The ToType field was not found in the translation. |
| ERR_TRANSLATION_MISSING_FROMNAME | −1010 | The FromName field was not found in the translation. |
| ERR_TRANSLATION_MISSING_ | −1011 | The FromType field was not found in the translation. |
| FROMTYPE | | |
| ERR_TRANSLATION_MISSING_MSGTYPE | −1012 | The MsgType field was not found in the translation. |
| ERR_OUT_OF_MEMORY | −1013 | There is insufficient memory to complete the current operation. |
| ERR_FILE_DOES_NOT_EXIST | −1014 | The filename given does not exist. |
| ERR_UNABLE_TO_OPEN_FILE | −1015 | Unable to open the given file. |
| ERR_UNABLE_TO_READ_FILE | −1016 | Unable to read from the given file. |
| ERR_UNABLE_TO_WRITE_FILE | −1017 | Unable to write to the given file. |
| Fatal Errors | | |
| ERR_COULD_NOT_CREATE_MSG | −2000 | Failed to allocate memory for a new message. |
| ERR_UNABLE_TO_FIND_KERNEL | −2001 | Unable to find the SILAS kernel; it may not be loaded. |
| ERR_UNABLE_TO_CREATE_WINDOW | −2002 | Could not create a hidden Windows(tm) window. This window is necessary for communication with the kernel. |
| ERR_UNRECOGNIZED_MESSAGE_VERSION | −2003 | The given message is not of the correct version; it must have been created by an older or newer version of the OCX. |
| ERR_UNABLE_TO_PARSE_GIVEN_CHARACTER_WIDTH | −2004 | The given message uses characters of a width that the OCX cannot handle. For example, a Unicode build of the OCX cannot handle ANSI messages. |
| ERR_MESSAGE_HAS_NO_ROOT | −2005 | The root of the given message was not found; it must be garbled. |
| ERR_TRANSLATION_PARSING_FAILURE | −2006 | No translations were found. |
| ERR_UNABLE_TO_CREATE_FILEMAP | −2007 | Unable to allocate memory for transmission of a message. |
| ERR_UNABLE_TO_VIEW_FILEMAP | −2008 | Unable to view allocated memory during transmission of a message. |
| ERR_NOT_IMPLEMENTED | −2009 | That function is not implemented. |
| ERR_ILLEGAL_NAME | −2010 | The name given is not valid; |
| ERR_ILLEGAL_TRANSLATION_FIELD | −2011 | The translation field given is not valid; |

Router Description

The primary activity of the Router is the routing of messages. It takes in messages from modules and dispatches them to all of the modules that have requested them. In one embodiment, it may also be responsible for informing modules when the messages that they provide are needed.

Data Structures

Text to Integer Map

For increased performance, all of the text strings used to describe a message (From Name, From Type, To Name, To Type and Message Type) and module names are mapped to integers for comparison operations. The text to integer map maps all of the strings currently seen to numbers; new entries in the map are added as new strings are seen.

Message Item

A message item is the internal representation of a message sent by one of the modules; it is also the means of communication between the Receiver thread and the sender threads. It exists only in the message queue. The structure of the item follows.

Figure 4:
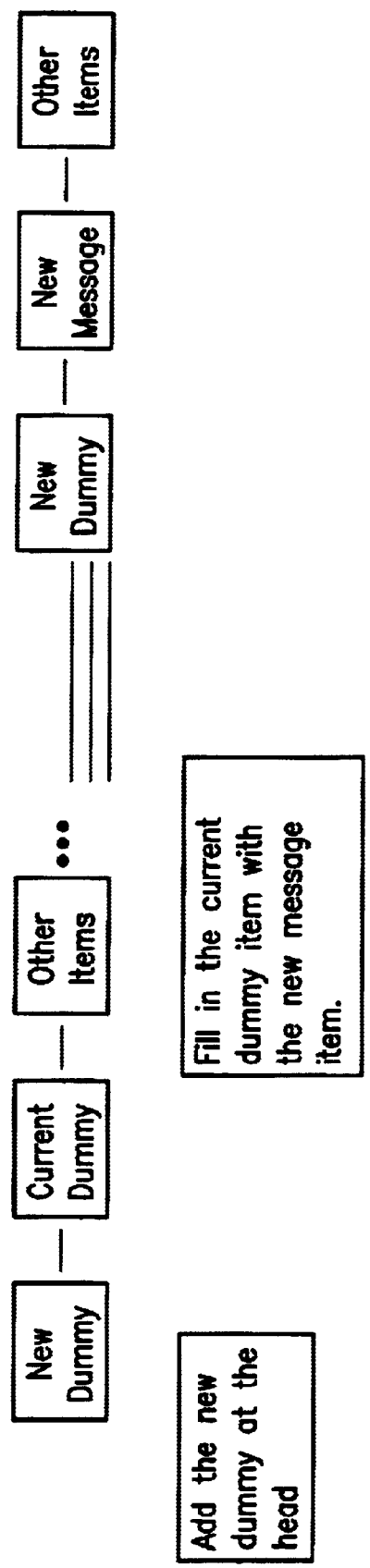
FIG. 4 shows the operation of the receiver thread of the Router with regard to message reception.

Message Description
 Item Type
 This field identifies the nature of the Message Item; it can take on the following values:
 >0 regular message
 0 dummy message
 −1 Request message
 −2 Ignore Request message
 Item Filled Event
 If this item is set, it is not the dummy item. The Item Filled event is only reset if the item is the dummy item. Since all new items placed in the queue start out as an empty dummy item and then get filled in, this event signals when the item is ready to be processed. This allows sender threads to efficiently wait for a new item.
 Integer Description
 The message destination/routing is represented by five integers that represent the five strings that describe a message (From Name, From Type, To Name, To Type, Message Type) as obtained from the text to integer map.
 String Description
 Also included are the strings to be used when a sender thread actually posts the message to a module (From Name, From Type, To Name, To Type, Message Type).
 Message Content
 The means used to communicate the data in a message is a file mapping. The content of a message is the name of the file mapping and the size of the file mapping. A handle to the file mapping is also included (it is held open until all sender threads have seen the message; the last one closes the handle).
 Sender Module
 This is the integer that corresponds to the name of the module that sent the message (obtained from the text to integer map). This is set to 0 for messages that do not need to identify the sender (regular messages).
 Touch Count
 Records the number of sender threads that still need to "touch" the item.
 Touch Count Mutex
 Only one thread may change or read the touch count of an item at a time; it must hold this mutex to do so. This protects against two threads trying to delete the same item.
 Message Queue
 The message queue contains all of the message items that have not yet been fully processed and one dummy item. The dummy item is always at the head of the message queue; it is differentiated from the other messages by the fact that it has an item type of 0 and its ItemFilled event is reset. The queue is a singly linked list (tail→head); pointers to the head and tail are maintained.
Threads
 The Router has two different types of threads that work together to carry out routing:
 Receiver Thread (1)
 This thread is the primary thread of execution. It handles receiving messages and all registry functions.
 Registration
 The Receiver records the registration information. This includes module names, module types and the interfaces for each. It also launches a Sender Thread for each registration. It gives the new thread a pointer to the head of the message queue so it can start processing messages.
 Message Reception
 When the receiver thread gets a message it creates a new dummy item and puts it at the head of the message queue (immediately after the current dummy item). It then fills in the fields of the current dummy item, opens the file mapping included in the message to guarantee that it will continue to exist until all of the modules have had a chance to get it, and places a handle to the mapping in the dummy item. It then sets the Touch Count of the dummy item to the total number of active threads (so they can all touch it before it is deleted). Finally, it changes the Item Type of the current dummy item to the item type for a regular message and signals its ItemFilled event. This process is shown in FIG. 4.
 Message Requesting
 When a module wishes to start receiving a certain type of message, the receiver thread places a Request message in the message queue (in the same manner that it places regular messages there). The Request message tells the appropriate Sender Thread to start passing messages of the given type on to its attached module.
 Message Blocking
 When a module no longer needs a certain type of message, it tells the Receiver, and the Receiver places an Ignore Request message into the message queue in the usual manner. That message tells the appropriate Sender Thread to stop passing on the given type of message.
 Sender Threads
 The sender threads each wait on a terminator event whenever they are sleeping. When the terminator for a particular thread gets set, terminates gracefully, deleting any allocations it has made, releasing the interface to the module it services and closing the terminator event; they do not touch the queue or any items in it when terminated. The receiver thread is responsible for cleaning up of the queue. To this end, the sender threads maintain a pointer to the item that they are currently processing; the receiver thread also has access to the pointer and uses it to clean up after the thread is terminated.
 Startup
 There is one Sender Thread per registration entry. Each time RegisterModule is called, a Sender Thread is launched to handle it. The thread is provided with the module name and interface that it is to service, and a pointer to the head of the queue. It begins to search the message queue for messages that it needs to pass on. Before it processes an item in the queue is performs an efficient wait on the ItemFilled event for the item. If the item is not the dummy item, the wait ends immediately. If it is the dummy item, the wait will not end until the dummy item is replaced by a new message; at that time the receiver thread will set the ItemFilled event and the sender thread will continue processing.
 All Messages
 When the thread is finished processing a message, it decrements the touch count and compares it zero. If it matches, then all of the threads have had a chance to see the message and it needs to be deleted. The thread closes the file mapping handle for the message, closes the handles and removes it from the queue.
 Regular Messages
 When a Sender finds a regular message in the queue it compares it with all of the messages it is supposed to pass on to its module. If it matches one, the Sender Thread calls the module with the message. The thread holds no mutexes when it sends the message and it immediately checks the termination event upon returning from the call. If there is an exception during the call to the module, the sender thread posts a message to the receiver thread requesting that the sender thread be removed (i.e., unregister the thread's module); it then waits for the terminator event. Under certain circumstances, though, the thread will continue to attempt to send the message after an exception occurs.

Request Messages

These messages are sent when a module wishes to start receiving messages of the given type. The thread compares the module name included with the message item to the one the thread was registered under. If it matches, the thread adds the given type to its list of messages to pass on.

Ignore Request Messages

These messages are sent when a module wishes to stop receiving messages of the given type. The thread compares the module name included with the message to the one the thread was registered under. If it matches, the thread removes the given type to its list of messages to pass on; if it isn't there, it does nothing. Only exact matches are removed.

General Operation

Figure 5:
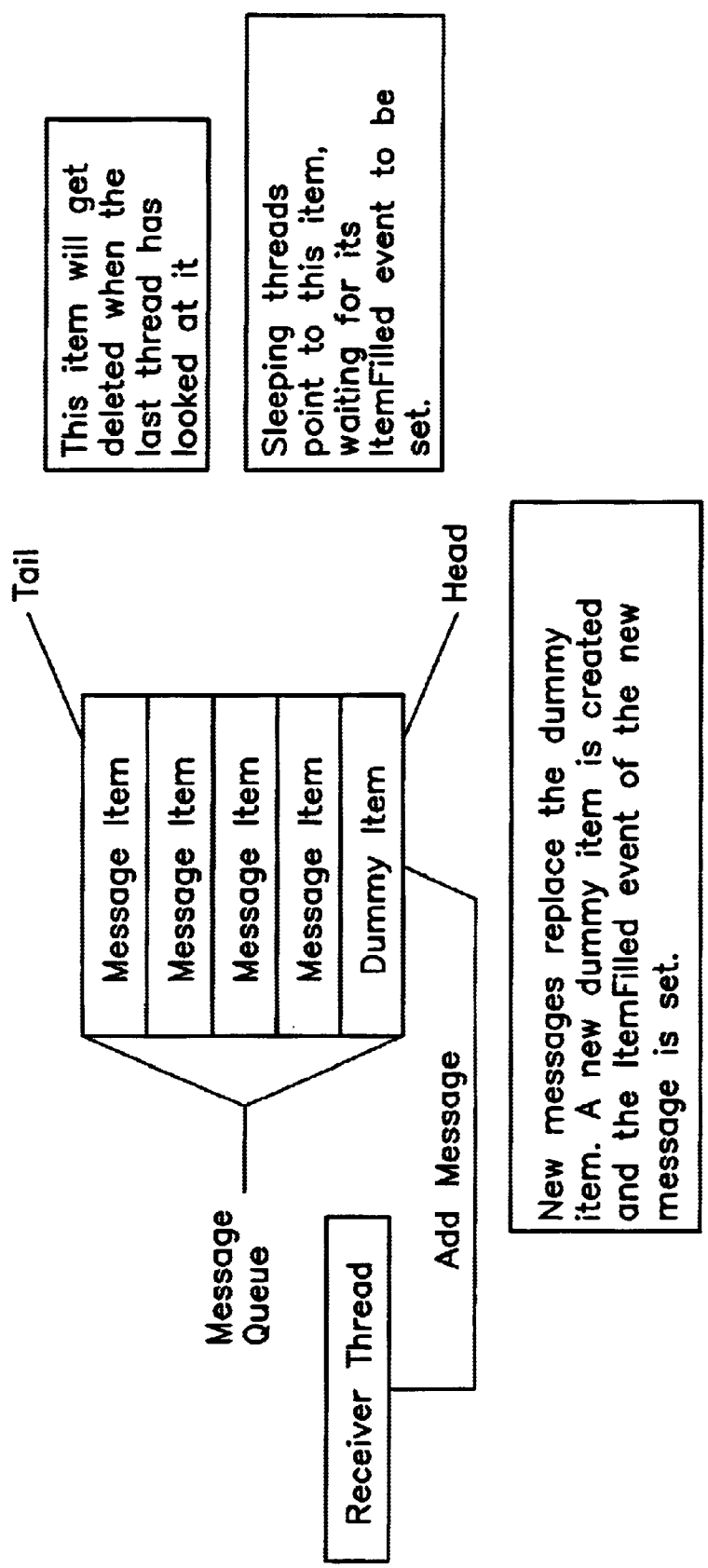
FIG. 5 shows the interaction of the receiver thread and the sender thread with the message queue of the Router.
Figure 6:
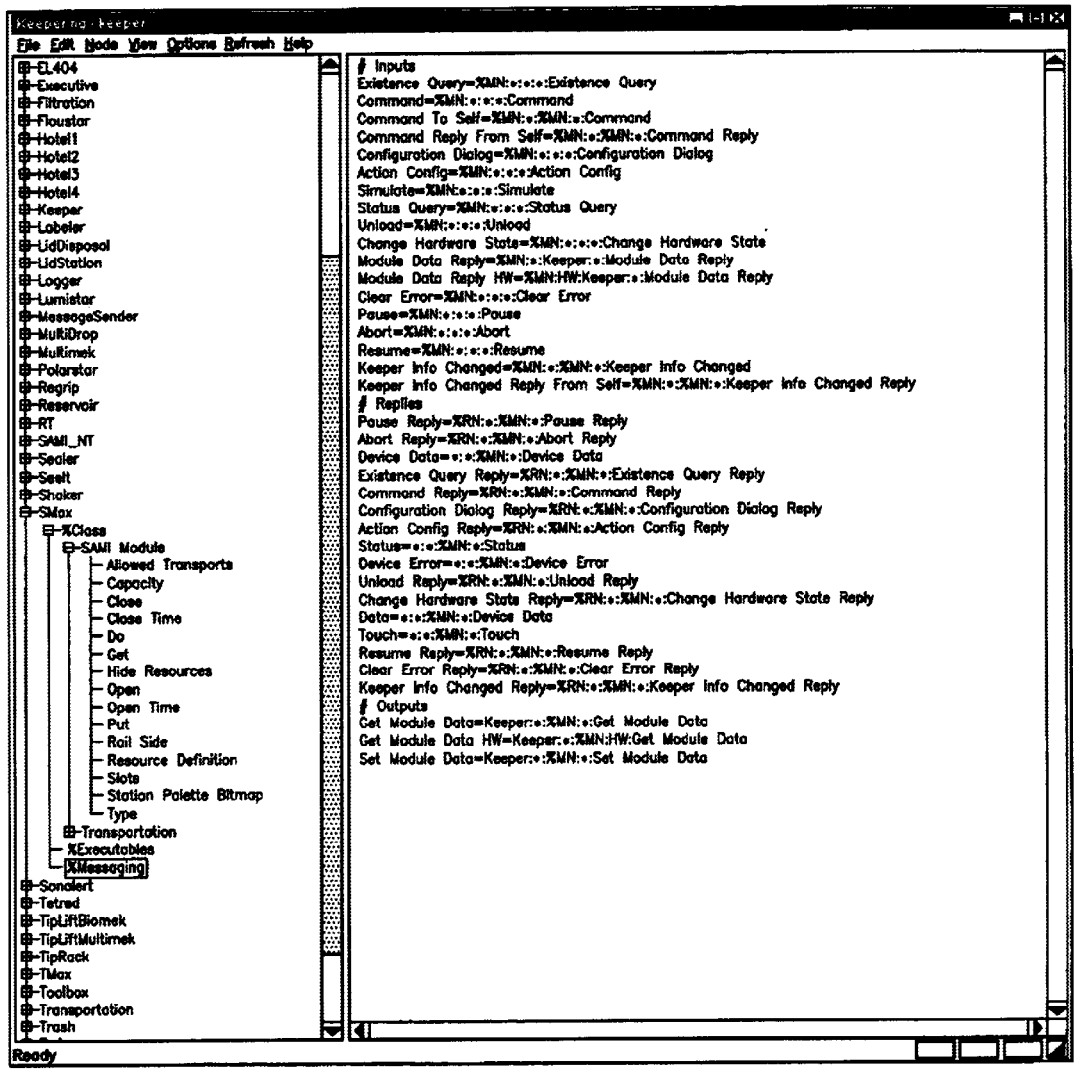
FIG. 6 shows a representative excerpt of the hierarchical nature of message definitions in the Keeper Registry.

The receiver thread creates a Sender Thread for each module registration it gets. It then puts Request messages into the message queue for each kind of message that the module has requested be sent to it. The sender threads then update their lists of messages to pass on. As the Receiver gets messages, it places them into the queue. The sender threads examine and deal with the messages as they get to them, calling out the their associated modules as necessary. The last thread to examine a message removes it from the queue. The foregoing process is shown in FIG. 5.

Messaging Control (OCX)

The Messaging Control (also referred to as "the OCX") provides a means for the Router to communicate with each module in a system, and for each module to communicate with the Router. In cooperation with the Keeper, the OCX controls where a module's outputs go and where its inputs come from. The OCX abstracts the module programmer away from other modules in the system. This allows module programmers to concentrate on the functionality of the module, rather than what other modules may control it or consume its output. The OCX notifies the module when a new message arrives, allows the user to manipulate messages (saving, creating, modifying, etc.) and send out messages. In one embodiment, the Messaging Control OCX is written using Visual C++4.2 with the DLL version of MFC (MFC42U.DLL). It is a Unicode program, with Windows NT as the target platform.

The Messaging Control will be embedded in each software module that uses the technique of the present invention. While it is believed that it will normally be advantageous to always use the Messaging Control to pass messages among modules in a software system, the invention and claims do not require that each and every module always use the Messaging Control (and Router) to exchange messages. Those of skill in the art will appreciate that the Messaging Control and use of the Router adds some amount of processing overhead, and it is possible that there may be modules for which it is important to minimize execution time. This will always be a trade-off, as conventional messaging techniques between software modules may be faster, but do not afford the ease of software maintenance and other advantages provided by the present invention. Nevertheless, for those software modules that do incorporate a Messaging Control as contemplated hereby, the following pseudocode provides an explanation of how code may be written.

The Messaging Control fires an event each time a message is received. Here is what the event handler would normally look like in a module:

procedure OnSilasMessage(sMessageName: string)
begin
   if sMessageName='Command' then
     ReadPlate(0)//0 here identifies the current message
   else if sMessageName='Action Config' then
     ShowActionConfig
   else if sMessageName='Unload' then
     UnloadModule
end;

When the module is loading it will also execute code similar to the following in order to inform the router that it wants certain messages:

SILAS.RequestMsg('Command');
SILAS.RequestMsg('Action Config');
SILAS.RequestMsg('Unload');

Message Format Description

Figure 3:
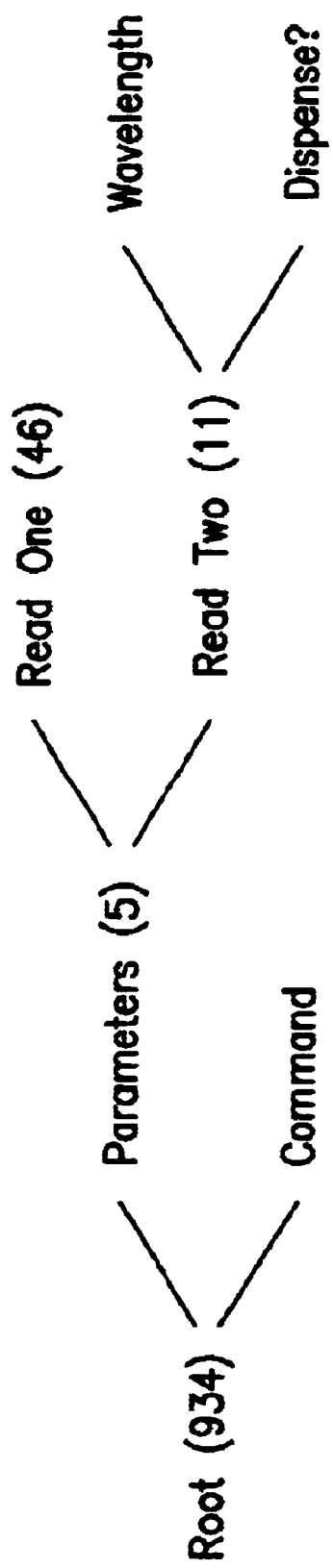
FIG. 3 shows a representative structure of the ID numbers of messages and submessages formatting according to one embodiment of the present invention.

From the point of view of a module, a message is structured like a tree. Each node in the tree has a set of strings associated with it and a set of submessages (children). Messages and submessages are identified by ID numbers; all methods that operate on specific messages or submessages require that this ID be provided as shown in FIG. 3. For instance, referring to FIG. 3, to get a string from the "Read Two" branch, one would use the number 11 to identify it:

Rome.GetString(11,'Wavelength')

The number that is associated with a particular branch is obtained by providing the number identifying its parent and a string key:

Rome.GetSubmsg(MsgID, 'Parameters')

The current message has a constant identifier (0), and when it is saved, a new number is provided to identify it. Similarly, when a message is created, the module is given the number with which to reference it. The numbers are generated on the fly, and when the message is transmitted, the numbers used by the receiver will likely differ.

Internal Representation

Internally, messages are represented in essentially the same manner as they are presented externally. A tree structure is maintained for each message. Initially, only the root node of a message has a number associated with it; when the module asks for a reference number for a particular node that doesn't have one yet, it is generated.

All of the numbers associated with the nodes are included in an ID→Message node map (hash table). This allows any node at any level of the tree to be found by a single number. The reference numbers are not themselves direct pointers to the nodes because for safety the OCX would have to validate them (look them up in a hash table) anyway.

All nodes on all message trees are structured identically; there is no difference between a node at the second level of the tree and the twenty-second level. However, the root nodes are differentiated by the fact that they have no parent. Each node has two maps (hash tables): The Key→String map and the Key→Submessage map. In both cases the key is a string. The submessage map contains pointers to the submessages (nodes) associated with the keys.

Node Data:

| Field | Purpose |
|---|---|
| pParent | Identifies this node's parent node; NULL for a root node. |
| mStrings | The data at this level of the message |
| mpChildren | The nodes which are children of this node, as identified by keys. |
| Enumeration State | Records the state of the enumerations of the strings and submessages. |
| ID | The number that identfies the node. Nodes that haven't been assigned ID's have a negative value in this field. |

Representation During Transmission

To send a message tree to another module the OCX must package it into a contiguous chunk of memory (a file map) as this is the preferred means of communication. A pre-order traversal of the tree is performed; the data for each node visited is written out as follows (the character I (vertical bar) will represent null (0)):

<Node Name>|<# of Children>|<Data Length>|<Node Data>
<Node Name>|<# of Children>|<Data Length>|<Node Data>
. . .

(Note: no CR-LF is included between nodes—it is added here for clarity)

| Field | Purpose |
|---|---|
| Node Name | The unicode string key corresponding to the submessage; this will be "Root" for the root node. |
| # of Children | The number of children that the node has |
| Data Length | A Unicode string that represents the number of unicode characters in Node Data. Since there is no terminator for Node data, this must be used to determine where the data ends. NOTE: No digit separators are used (i.e., no commas) |
| Node Data | Holds the strings associated with the node. |

Internally "Node Data" is formatted similarly:

<Key>|<String Length>|<String>
<Key>|<String Length>|<String>
<Key>|<String Length>|<String>

(Note: no CR-LF is included between key-string pairs—it is added here for clarity)

| Field | Purpose |
|---|---|
| Key | The key that identifies the string |
| String Length | A Unicode string that represents the number of unicode characters in "String". Since there is no terminator for "String", this must be used to determine where it ends. NOTE: No digit seperators are used (i.e., no commas) |
| String | The string associated with the given key |

Message Manipulation

As noted above, the Messaging Control OCX provides a rich set of methods for manipulating a message.

Assigning Numbers

The module will refer to messages and submessages by a numeric identifier; for the modules purposes, every message node has a unique number. Internally, a node only gets a number when it is needed (i.e., when the module requests it). All nodes can be reached by enumerating the root nodes (which always have ID's) and then traversing the message tree of each root message.

To generate unique numbers, the OCX maintains a counter that is incremented each time a new number is needed. A check is made to see if the number is in use (looking it up in the hash table); if it is in use, the counter is incremented again. This continues until an unused number is found. (Note: here, incrementing includes wrapping the value such that it is always in the range $(1, 2^{31}-1)$).

Creation and Deletion

The Current Message

The current message is held separately from all of the other messages held by the OCX. For simplicity in accessing messages, the number 0 will exist in the ID→Message map when there is a current message; its entry will contain a pointer to the root node of the most recently received message. When there is no current message, there will be no entry for 0 in the ID→Message map. The current message will be created when a message is received and deleted when the module's RcvMsg event handler finishes, or the user calls WaitFor, whichever occurs first. If a WaitFor call succeeds, the current message will be the message that the module was waiting for; if it fails, there will be no current message. The status of the current message will not change after the OCX automatically waits for a return receipt (i.e., the return receipt does not become the current message).

Other Messages

Other messages may be created by saving the current message or by building from scratch. After the current message is saved, two numbers will reference the message: 0 and the number assigned to it. This will be true until the RcvMsg event ends or WaitFor is called, after which time only the assigned number will reference it. Any message which is not the current message will only be deleted when the module explicitly requests it or the module unregisters.

String Retrieval

When a module wishes to retrieve a string from a message, the appropriate message is found using the reference number and key supplied. If either is invalid, an error code is returned. All strings are internally held in MFC CStrings. Because data strings (not keys) may contain null characters, in one embodiment, it is important that no routines be used that assume null-termination. Fields that are used by the OCX (system keys) may never contain null characters. This simplifies the OCX, since it only manipulates the data associated with system keys; all other data is only handed to the module. It is known that in MFC 4.2, a CString with embedded nulls can be turned into a BSTR with embedded nulls using CString::SysAllocString. The OCX will use this method of returning a string to a module.

String Storage

When a module wishes to add a string to a message, the appropriate message is found using the reference number supplied. If the ID is invalid, an error code is returned. The MFC 4.2 implementation of Invoke converts BSTRs (length prefixed strings) into a LPCTSTR pointing at the string portion of the BSTR. In order to copy this into a new CString for storage, the length of the string must be determined. Since the string may contain null characters, one must examine the length prefix. This means that the OCX will look at the 4 bytes previous to the string; the validity of this operation is dependent on the MFC 4.2 implementation. The MFC 4.2 copy constructor for the CString does not assume a null terminated string, which allows the data strings to be copied freely. The validity of this operation is dependent on the MFC 4.2 implementation.

Message Copying

Copying a message (and its submessages) requires that the full tree under that message be reproduced. The ID numbers for the new submessages will be set to a negative number rather than copied.

Message Deletion

When a message is deleted the full tree under that message will be deleted. The message ID of each node of the message tree will be removed from the ID map.

Enumeration

The module will be able to enumerate all of the strings and submessages at any particular level of the message. The enumeration facilities of the MFC CMapStringToString and CMapStringToPtr will be used. A POSITION will be held for each map (hash table), indicating the status of its enumeration.

Message Storage

To allow a module to store a message on disk or other media outside of the OCX's control, the OCX will, on request, provide a string representation of a message. It will also allow the creation of a message from a string (i.e., reverse the process). This will be done in the same way that a message is sent through the router; it will be converted into a chunk of memory and then into a BSTR. When a message is created from a string, the usual method of building a message tree will be used.

The Interface to the Router

Registration

When the module makes a call to RegisterModule, the OCX must first find the Router. The Router registers itself as the active object of type "Rome.Kernel". It is simply a matter of using standard OLE functions (CLSIDFromProgID and GetActiveObject) to get an IDispatch interface (the OLE Automation interface) on the Router. Once that is done, the OCX needs to do the actual registration. This requires that the OCX provide the Router with an interface to use when the Router needs to notify the OCX of a new message; this is done by making a call to the RegisterModule method of the Router interface.

Router to OCX

The Router communicates to modules by executing standard methods on them; the module must have a function that the kernel can call (using OLE) whenever a message arrives or something else happens. Currently, there are only two standard methods that must exist with special id's:

[id(1)] void PostMsg(BSTR ToName, BSTR ToType, BSTR FromName, BSTR FromType, BSTR MsgType, BSTR FileMapName, long MapLength);

[id(2)] void MsgWanted(BSTR ToName, BSTR ToType, BSTR FromName, BSTR FromType, BSTR MsgType, boolean Wanted);

PostMsg is used to notify the OCX that a message has arrived; its parameters specify the addressing information and the map that contains the contents of the message (in the form of a Win32 file map).

OCX to Router

The Router registers itself as the currently active Rome.Kernel object; this allows the OCX to find it. The Kernel has a set of methods for registering, requesting messages and sending messages.

Translations

In one embodiment, the Kernel uses a five part address to route messages:

ToName, ToType, FromName, FromType, MsgType

The OCX presents the module writer with the ability to specify an address using a one part address (the message name). This address is then translated to a five part address (or several of them) when the message is sent through the kernel. This allows the routing of a module's messages to change without changes to the module's code.

The translations are stored in the Keeper module in a branch named "%Messaging". There is one such branch for each module. When the OCX is registering the module (during RegisterModule) it queries the Keeper for these translations; if the Keeper does not respond, the OCX will time out and fire the Initialized event with an error code.

Since the Keeper must communicate through the Router using the same OCX as the rest of the modules, the OCX provides a property and method specifically for the Keeper. The property (bRetrieveTranslations) allows a module to stop the OCX from querying the Keeper for translations. The method (AddTranslation) allows the module to add a translation; in this way, the Keeper can use the normal OCX and provide hard-coded translations for itself.

Message Reception

Several technical issues come into play when it comes to how the OCX will process a message and present it to the module.

File Maps

Win32 allows one to create a file map (the contents of a file mapped into a linear address space so one can simply view the file as memory) on the page file and give it a name. The name given to it is valid in any process space; this is the way the Router passes data between modules. A file map is of fixed size (can't be grown or shrunk) once created. To overcome this, the OCX uses several features of Win32 memory management. The OCX will reserve a chunk of memory (using the reserve flag); then, as the map is filled in, the map will be committed piece by piece. The initial reservation will be a guess; if the message turns out to be too big (i.e., the system runs out of space in the middle of building it), a new guess will be made (double the old one) and the previous memory map will be copied to the new, bigger one. Future guesses will be at the larger size. It is also important to note that a memory mapped file only exists while some process holds a reference to it. The OCX will name its file maps in the following way:

%%<Module Name><Module Type><counter>_

If a conflict occurs (i.e. the name is already in use), the counter is incremented and another name is generated. This continues until an unused name is found. The counter is incremented after each message is sent.

OLE Method Calls

The Router uses OLE to make method calls on the OCX (PostMsg). These calls can only be made in a blocking mode; this means that the caller is blocked (sleeping) until the method finishes executing. This requires that the Kernel have multiple threads so that it can service many different modules simultaneously. The current implementation of the Kernel has a single thread per registered module; this thread services a given module, making the method calls when messages arrive.

Message Flow

When a message comes in, the PostMsg method is called by the Router. Because a file map only exists while some process holds a reference to it, it is important that the information in the file map be retrieved during the execution of the PostMsg method; the Kernel will ensure that the map exists until after the end of the PostMsg call by maintaining a reference of its own, but after that point its existence is not guaranteed.

The file map for the message is opened and the OCX builds a message tree from the contents. The file map is then closed. Because OLE calls are blocking, it is important that the RcvMsg event (which allows the module to process the message) not be fired during the execution of the PostMsg method. If it were fired then, it is possible that the module would call the WaitFor method; it would then timeout because no more messages can be received until the Post-Msg method returns (allowing the thread in the Kernel to stop blocking). Problems will also occur if the module tries to unregister itself during the RcvMsg event.

A Windows™ message is then posted to the Bouncer window with a pointer to the root of the new message tree. Once that is done, the PostMsg method returns. At some time after that, the Bouncer window receives the message and calls the message handler in the OCX.

What this handler does with the message is dependent on the current state of the OCX; most of the complication comes from properly handling WaitFor calls The WaitFor method runs a Windows™ message loop, checking a flag after the processing of each message; the flag indicates whether the most recently awaited message has arrived. This is further complicated by the fact that it is possible that the user will call WaitFor in the middle of the message loop of a previous WaitFor (since regular events will occur during the loop). This is dealt with in the following manner:

A wait stack is maintained that contains the identity of each message that is currently being awaited; the item at the top of the stack is the most recent.

A held message list is maintained; this list holds messages that are awaited (i.e., indicated in a previous WaitFor call), but whose matching item on the wait stack is not at the top yet.

When a message comes in, a check will be made to see if the wait stack is empty. If it is, then the message becomes the current message and the RcvMsg event will fire. After the event is done, the current message is deleted (if it wasn't saved) and the reference to it in the message ID map is removed.

If the wait stack is not empty, the new message will be compared with the top item on the wait stack. If it matches, then it is added to the held message list and a flag is set; the flag tells the WaitFor routine that it needs to check the held message list against the message it is waiting for. When the message handler returns, the most recent WaitFor function will get control and notice that its wait is over. If the new message doesn't match the item at the top of the wait stack, it is compared with each of the other items in the wait stack. If it matches any of them, it is placed in the held message list, and the message handler returns.

Reflector Window

In order to receive a Windows™ message, there must be a window to receive it. The OCX has no visual representation, and as such has no window. To allow it to send messages to itself a hidden window is created to "reflect" messages to the control. Currently, only one message (the message indicating a message has been received) is reflected. The reflector window simply acts as a pass through for messages that it reflects; a function prototyped exactly like a regular window handler is called in the OCX (the message handler mentioned in.

Non-Blocking Waiting—WaitFor

The WaitFor method provides a way to wait for a particular message, without blocking the reception of other messages (or events). This means that using this function may cause re-entrancy. This method performs a Windows™ message loop;

after each message is processed in the usual manner, a flag is checked. When the flag is true, it tells the WaitFor routine that it needs to check the held message list against the message it is waiting for (usually set by the message handler when the awaited message is received). If the top message in the wait stack matches any of the messages in the held message list, the waitfor function stops looping, pulls the held message off the list and makes it the current message. It then returns. If the top message in the wait stack does not match any of the messages in the held list, the method will reset the flag and continue looping.

After each message is processed, the time is checked to see if the timeout period has passed; if so, the method stops processing messages and returns. When there are no messages in the queue, the method will use MsgWaitForMultipleObjects to sleep until the timeout occurs or a message comes in.

Translating Incoming Messages

The OCX will translate the 5-part addresses used by the kernel into the one word addresses used by modules. Only the first matching translation will be used; if no translation matches, the message will be ignored. The translation will occur during the execution of the PostMsg method.

Building a Message Tree

Messages are stored by performing a pre-order traversal of the message tree. To generate a message tree from a message map, the following algorithm will be used The details of the parsing are explained above.

Maintain a parent stack; this stack will contain pointers to parent nodes.

Starting from the first node in the map:

1. Create the node and build the map of string data.
2. If the stack is empty, this is the root node, so save a pointer to this node and skip the rest of this step.

Pop an item from the parent stack. Copy that to the parent pointer of this node. Add the name of this node to the string→child map of the parent.

3. For each child of this node (as given in the file map) push a pointer to this node onto the parent stack.
4. Repeat on the next node in the file map Error Codes All error codes will be 32-bit values. The error codes for the various methods will not overlap.

Keeper Description

A "Keeper" is defined as a combination of: (a) a collection of message translations describing messages that may be exchanged among software modules in a software system comprising multiple modules and in which at least two of the modules utilize a common control to exchange messages; and (b) software capable of maintaining (a). At a minimum, a definition of a "message translation" includes (i) a name of the translation (also referred to as a "translation name" or a "key"), and at least the following message attributes: (ii) the name of an intended recipient module, (iii) a type of an intended recipient module, and (iv) an identifier indicating a type of a message. In one embodiment, message attributes (ii), (iii) and (iv) may be specified by a universal match indicator, such as an asterisk ("*"), which means the particular message attribute, when used to indicate a message attribute to be received, may match anything, as described further below. There may be additional message attributes defined for each message type. For example, in one embodiment, fields may be added indicating: (v) the name of the sending module; and (vi) the type of the sending module.

In one embodiment, the collection of message translations may be stored in a registry which is accessed by the software included in the Keeper. Different collections of message translations may be grouped together. For example, in FIG. 7, there are sections for "input" message translations, "reply" message translations, and "output" message translations.

In one embodiment, the Keeper also stores and maintains other configuration settings for the software system, in a hierarchical manner analogous to the registry in Windows. The term "Registry" is used herein to refer to the database maintained by the Keeper, and does not necessarily mean the registry used by Windows or some other operating system. Nevertheless, it would be possible for one of skill in the art to store all of the information normally stored in the Registry in the Windows (or other operating system) registry. In the representative Registry, an excerpt of which is shown in FIG. 7, the top level of the hierarchy comprises a software module name for each software module. In this example, some of the software modules control communications between the software system and various pieces of robotic equipment. For example, the SMax software module includes subdirectories for Class, Executables, and Messaging. The collection of definitions of message types used by the SMax module are shown in the right hand pane. Each line in the right hand pane (except for lines beginning with #, which are comment lines) comprises a definition of a message type. In the embodiment shown in FIG. 7, each message translation has a translation name and five message attributes. The translation name, is followed by an equal sign (=), The following five message attributes are separated by colons (:), and represent: (i) the name of the intended recipient module, (ii) the type of the intended recipient module, (iii) the name of the sending module, (iv) the type of the sending module, and (v) the message type.

In one embodiment of the invention, the Keeper stores program-specific settings for each of the programs, and the Keeper software is responsible for the loading and unloading of programs, and maintains reference counting on each of the programs. When a program is no longer needed, for example, after an automated assay has completed, the Keeper software unloads the software. It should also be appreciated that other software modules or the user of the software system can also cause software modules to be loaded directly without involving the Keeper.

The specific techniques and methods that may be used to perform the tasks of the Keeper is well-known within the software programming and data storage arts, even though the Keeper comprises the particular combination of data and functions specified above as being required of the Keeper. Further details of a representative embodiment of a Keeper are as follows.

The Keeper acts as a central repository for all configuration information, providing both a user interface and a software system interface on the information that it holds. It is also responsible for loading and unloading other modules; it keeps track of which modules are currently needed and how many references there are to them. Modules are only unloaded after all references to them have disappeared (via unload requests).

Data Structure

The Tree

The Keeper may present its data in a tree or directory structure. This means that when one wishes to get at a particular piece of data, it will be specified by giving a path from the root of the tree (e.g., SMax\foo\dir). In one embodiment, relative specification of nodes on the tree is not be supported. By convention, each module in the system that comprises the Messaging Control will have a branch off the root associated with it.

Leaf Nodes

In one embodiment, branches of the tree will not hold data; only leaf nodes will contain data. Until such time as data is inserted in a node, it is considered a branch node; once data is inserted it will be considered a leaf node and cannot be converted back unless it is deleted and recreated. The data may be in the form of a Unicode string. All characters including embedded nulls may be allowed. The only limitation on the length of the data will be available disk and memory.

Special Leaf Nodes

Certain nodes in the tree may be set aside as special. These nodes are found immediately off of the branch for each module (i.e., each module has its own). In one embodiment, %Executables and %Messaging are required by the Keeper for the module to be run; the others are optional.

%Executables

This node, found immediately off of the branch of each module, contains the set of executable files, one per line with full path, that should be launched when the module is loaded. The executables will be loaded in the order given, top to bottom.

%Helpers

This node, found immediately off of the branch of a given module, lists all other modules that should be loaded along with the given module. They are given one per line and are loaded in the order given, top to bottom. If the line: %THIS is placed in the list, the executables found in %Executables will not be loaded until all helpers before the %THIS line have loaded. Modules listed after %THIS will be loaded after the executables have finished loading (responded to an existence query).

%Messaging

This node holds the message translations for the module.

%Class

Under this branch is a branch for each class that the module fits under. The contents of the leaves are undefined.

%Properties

Under this branch are entries that describe the module. The actual set of properties depends on the module. This set of properties should not be confused with the properties provided in a status message; these properties are static, those in a status message are dynamic. An example of a static property is the carrying capacity of a Transport module.

Interfaces

Data Manipulation

The Keeper interface will allow other modules, through messages, to create, copy, delete and rename both branch nodes and leaf nodes. It will also allow modules to get and set data from leaf nodes using messages. Modules may also provide a full branch structure to be appended to the tree. All operations may require a full path within the tree.

Searching

Modules will be able to identify which modules contain a certain path; for instance, to find out all modules that output Data, one would search for the path Outputs\Data. Modules may also specify what the leaf node at the end of the path must contain for the module to be included in the match list; for instance, if one wanted to find all modules that output a Data message with a Count of 3, one would give a path of Outputs\Data\Count and a leaf contents of 3.

Loading and Unloading

The Keeper interface will allow modules to load and unload other modules. To deal with the fact that multiple modules may be simultaneously trying to load or unload a particular module, the Keeper may implement reference counting on each module. Modules will remain loaded while they have references to them and be unloaded at some time after all references disappear. Modules will not be immediately unloaded; instead, they will be left loaded but unreferenced for a time. Once a certain amount of time has passed since the last reference (configurable through the user interface) or on command (via the user interface or a message) the unreferenced modules will be unloaded (using ROME messages).

User Interface

Data Manipulation

The Keeper provides a graphical interface for user editing of all information that it holds. A view of the tree and a view of the currently selected leaf node (if any) will be presented. The data in a leaf node will be presented in a text format; appropriate actions will be taken to assure that binary data is viewable as though it were text. The %Messaging node may have a viewer that shows the translations in a table format.

Loading and Unloading

The Keeper may present the user with the ability to load modules. The user may also be able to force the unloading of all unreferenced modules. It is desirable that the user be able to unload referenced modules as well; the interface to this may be hidden if possible.

Importing and Exporting

The user may be able to import and export branches of the tree. Full paths to any Registry files involved as well as full paths within the Registry files involved may be required.

Keeper Messages

The Keeper may have the following message types defined for it.

Load Module—The keeper is responsible for loading the module, verifying that it loads correctly and replying to this message with the results. The Keeper may not actually need to load the module if it is already running; in this case, the Keeper will simply increment a reference count, to keep track of how many modules expect the module to be running.

| Key | Data |
| --- | --- |
| Instance Name | The instance name of the module (e.g., Robot1, SMax, Lumistar) |

Load Finished—This message is a reply to the Load Module message. It indicates whether the instance loaded successfully.

| Key | Data |
| --- | --- |
| Instance Name | The instance name of the module (e.g., Robot1, SMax, Lumistar) |
| Success? | One of [True, False] If true, the module was loaded successfully. If false, an error occurred (and the following two fields will be included). |

-continued

| Key | Data |
| --- | --- |
| Reason | Comma delimited list of all of the following that apply: Timed Out, Not Found, Not Registered |
| Error Text | Error description aimed at the user |

Unload Module—This message is sent to the Keeper in order to unload a currently running module. The Keeper decrements its reference count on the module and if no references remain, it unloads the module (after a "caching" delay).

| Key | Data |
| --- | --- |
| Instance Name | The name of the module to unload. If this is %UNREFERENCED, all modules that are "cached" (no references, but still loaded) will be unloaded. |

Unload Finished—This message is a reply to the Load Module message. It indicates that the instance unloaded successfully (or the reference count was decremented).

| Key | Data |
| --- | --- |
| Instance Name | The name of the module instance |
| Reference Count | The reference count after the unload message is processed. |
| Success? | One of [True,False] If true, the module was loaded successfully. If false, an error occurred (and the following two fields will be included). |
| Reason | Comma delimited list of all of the following that apply: Timed Out, Not Registered, Not Loaded |
| Error Text | Error description aimed at the user |

Module List Query—This message is usually sent to the Keeper to find a set of modules.

| Key | Data |
| --- | --- |
| Match Path | The path that must exist under the module for it to be included in the match list. For instance, to get all modules that output "Data", one would provide: "Outputs\Data". |
| Leaf Value | If the path specifies a leaf (e.g., Outputs\Data\Count), this field will specify what data the leaf must contain for the module to be included in the match list. |
| Loaded? | One of [True,False]. If not present, all modules are included |

Module List Reply—This message is sent in response to a Module List Query. It lists info on all of the modules that match the criteria.

| Key | Data |
| --- | --- |
| <Module Name> | A submessage containing the matched path for the module. For instance, if te matched path was Outputs\Data, and the SMax has that path, this field would be the contents of SMax\Outputs\Data, including all sublevels, etc. |

Get Module Data—This message requests registry data from the Keeper.

| Key | Data |
|---|---|
| Path | Specifies the path into the registry tree. This path is much like a path in Windows: dir\dir\dir\dir where dir is the name of a branch Generally, the first "dir" is the instance name of the module since data is kept on a module by module basis. The path can specify a branch or leaf node. If it specifies a branch node, all branches under that node will be returned. |

Module Data Reply—This message is sent in reply to a Get Module Data message. It provides the requested data.

| Key | Data |
|---|---|
| Success? | One of [True,False] Set to true if the query succeeded. |
| Path | Specifies the path to the data being provided. |
| Data | The data contained in the requested node and all branches under it if it's a branch node. |
| Error Reason | One of: Path does not specify a leaf node Path does not exist Registry Broken |

The Keeper will respond to all received messages with appropriate error messages if an error occurs. No user interface (e.g., dialog boxes) will be brought up if the error results from a ROME message.

Adding a Module

Those of skill in the art will readily appreciate the elegance with which the present system allows additional modules to be added to an existing software system with little or no modification to pre-existing software modules. A specific example of how code could be written is follows. First, assume a simple system comprising two modules, a controller and a reader, in which the controller instructs the reader to take a reading. It is envisioned, while not mandatory, that the controller module and the reader module would be under the control of a single operating system. Conventional programming techniques using COM suggest the following pseudocode be used:

Controller Code:

```
procedure ReadPlate;
var
   Dev: IDeviceInterface;
begin
   Dev:=CreateObject('Fluostar.Reader')
   Dev.ReadPlate(ID, WaveLength1, Wavelength2, Temperature Setting, Cycles)
   while not Dev.FinishedReadingPlate do
      wait;
end;
```

Reader Device Code:

```
procedure ReadPlate(ID, Wavelength1, Wavelength2, TempSetting, Cycles)
begin
   // Make the hardware read the plate
   // save the data to disk in a hardcoded format
   Dev.FinishedReadingPlate=true
end;
```

Now, assume further that one desires to add a third module to the system to log the commands and data to a proprietary database. The changes to the foregoing code would be as follows. (The added code is in bold)

Controller Code:

```
procedure ReadPlate;
var
   Dev: IDeviceInterface;
   Logger: ILogger;
begin
   Dev:=CreateObject('Fluostar.Reader')
   Dev.ReadPlate(ID, WaveLength1, Wavelength2, Temperature Setting, Cycles)
   Logger:=CreateObject('Database Logger')
   Logger.LogFluoCommand('Fluostar.Reader', ID, WaveLength1,
      Wavelength2, Temperature Setting, Cycles)
   while not Dev.FinishedReadingPlate do
      wait;
end;
```

Reader Device Code:

```
procedure ReadPlate(ID, Wavelength1, Wavelength2, TempSetting, Cycles)
var
   Logger: ILogger;
begin
   // Make the hardware read the plate
   Logger:=CreateObject('Database Logger')
   Logger.LogFluoData(ID, WaveLength1, Wavelength2, TempSetting, Cycles, Data)
   Dev.FinishedReadingPlate=true
end;
```

Note that to add the logging, both pieces of code are changed. In a system comprising hundreds of modules, if logging was desired from all 100 modules, each module would need to be changed in a similar manner.

Pursuant to the present invention, the code for original two-module system would be as follows.

Controller Code:

```
Procedure ReadPlate;
var
   nCommand: integer;
begin
   // tell the SILAS Router to send the Controller all
      "Command Reply" message types
   SILAS.RequestMsg('Command Reply');
   nCommand:=SILAS.CreateMsgtoSend
   SILAS.AddString(nCommand, 'Wavelength', Wavelength1)
   SILAS.AddString(nCommand, 'Temperature', Temperature)
   SILAS.AddString(nCommand, 'Cycles', Cycles)
   SILAS.RequestMsg('Command Reply')
   SILAS.SendMsg(nCommand,'Command')
   SILAS.WaitFor('Command Reply')
end;
```

Reader Device Code:
```
procedure ReadPlate(nCommand)
var
   nReply, nData,i: integer;
begin
   // tell the SILAS Router to send the Reader all "Com-
       mand" and "Unload" message types
   SILAS.RequestMsg('Command');
   SILAS.RequestMsg('Unload');
   // pull the parameters
   Wavelength:=SILAS.GetString(nCommand,
       'Wavelength')
   Temperature:=SILAS.GetString(nCommand,
       'Temperature')
   Cycles:=SILAS.GetString(ncommand, 'Cycles')
   // make the hardware read the plate
   // make a data msg
   nData:=SILAS.CreateMsgToSend
   // copy the original command into it
   SILAS.CopyMsgToKey(nCommand, nData,
       'Command')
   // throw in the 96 wells of data
   for :i=1 to 96 do
       SILAS.AddString(nData,'Data Point'+i, Datapoint
           [i])
   // tell the controller that we are done
   nReply:=SILAS.CreateMsgToSend
   SILAS.AddString(nReply, 'Success?', 'True')
   SILAS.SendReply(nReply, 'Command Reply',
       nCommand)
end;
```
In the above example, the Keeper Registry would contain at least two message translation entries for the Controller module defining the translation names "Command" and "Command Reply" and their associated message attributes. Thus the following may be stored in the Registry in the Controller\%Class\%Messaging subdirectory (The #Inputs and #Outputs are comment lines):

Inputs
CommandReply=%MN:*:%MN:*:Command Reply
Outputs
Command=Controller:*:%MN:*:Command The Keeper Registry would also contain, for the Reader module, translation names of "Command," "Command Reply" and "Unload" and the associated message attributes in the Reader\%Class\%Messaging subdirectory:

Inputs
Command=%MN:*:*:*:Command
Unload=%MN:*:*:*:Unload
Outputs
Command Reply=%MN:*:%MN:*:Command Reply The Controller code sends a message using the "Command" message translation via the line "SILAS.SendMsg (nCommand, 'Command')", and the Reader module, after getting a reading, sends a message using the "Command Reply" translation name via the line: "SILAS.SendReply (nReply, 'Command Reply', nCommand)." In both cases, the message is received by the Router (which in this example has the module name SILAS), which in turn, sends the messages to any module that may have requested to receive messages matching, for example, the filter conditions represented by the "Command" or "Command Reply" message attributes.

To add a third module to the system to log the commands and data to a proprietary database, neither the Controller Code nor the Reader code would require modification. Instead, a new Logger module would merely contain commands such as the following:

At some time previous to the messages being sent (e.g., when the logger starts up, or at the start of a run), the logger would request the appropriate messages to be logged:
SILAS. RequestMsg('EveryMessage')
. . .
When a command message comes in, the following procedure might be called:
```
procedure LogCommand(nCommand)
begin
   // pull the destination name from %Address\ToName
   Module=SILAS.GetString(SILAS.GetSubmsg
       (nCommand, '%Address'), 'ToName')
   // pull the parameters
   Wavelength:=SILAS.GetString(nCommand,
       'Wavelength')
   Temperature:=SILAS.GetString(nCommand,
       'Temperature')
   Cycles:=SILAS.GetString(ncommand, 'Cycles')
   TimeStamp:=SILAS.GetString(ncommand, 'Cycles')
   // write out a comma-delimited list of the parameters
       and the time to a file
   Writeln(CommandLogFile, Module+','+Wavelength
       +','+Temperature+','+Cycles+','+TimeStamp)
end;
```
In addition, an entry could be made in the Keeper defining a "EveryMessage" message type in the LogCommand\%Class\%Messaging subdirectory as follows:
Inputs
EveryMessage=*:*:*:*:*

Those of skill of the art will appreciate that the above data logging procedure may comprise the common message handling control merely be referencing SILAS.RequestMsg and SILAS.GetString in the lines. Accordingly, it is not necessary for the source code of the common message handling control to be repeated in each software module, although it is necessary that each software module that accesses the control and the control itself be under the control of a common operating system. Moreover, it will be appreciated that the SILAS.RequestMsg reference is operable to update the routing table to indicate that the added module should receive messages having a message attributes that match the message attributes defined by the "EveryMessage" message type. In the above example, where all *'s are used as message attributes for the EveryMessage translation name, every future message will match the "EveryMessage" message type, so the Router will send every message to this logging module. Accordingly, it will be appreciated that the message attributes of a translation name specify a filter condition against which the Router compares each message to determine the modules to which each message should be sent. As noted above, a module may use the Router.RequestMsg(TRANSLATIONNAME) message to request that the Router send the module future messages whose message attributes match the message attributes of the translation name specified in the RequestMsg message.

It will further be appreciated that the present invention provides software messaging control means for dynamically defining and building a message according to a common message format, as shown, for example, by the use of the AddString method described above, wherein data element names and values are supplied to the common messaging control. Moreover, the present invention provides software messaging control means for receiving, from the software module in which the software messaging control it is included, a data element name for data contained in a received message, and means for parsing the received message and providing the software module with the data corresponding to the data element name. Examples of this are the invocation of the GetString and GetSubmsg methods shown above. Because the GetString and GetSubmsg methods can retrieve message contents by keys, the retrieval of these message contents does not require the programmer to know the sequence of the of the desired message data element within the entire message.

Although a specific embodiment of the invention has been disclosed with reference to a preferred embodiment, it will be understood by those of skill in the art that changes in form and details may be made without departing from the spirit and scope of the invention. The present invention is in no way limited to the details disclosed herein. Accordingly, the present invention is to be defined and limited solely by the scope of the claims.

For example, while a software system may include modules that utilize a common message handling control to exchange messages, it is not required that each and every module in the system use the control. For example, there may be one or more groups of software modules that, in operation, are executed with higher frequency than other software modules. Because the message handling system described herein adds some amount of processing overhead, it may be appropriate to utilize conventional, direct addressed messaging techniques for these modules, instead of the disclosed message handling system. Furthermore, many commercial software system a built using third-party software components. Often, such pre-existing components will not be configured by the manufacturer to utilize the message handling system disclosed herein. Such systems are not precluded from being within the scope of the claims.

What is claimed is:

1. A software system comprising:
   a Keeper for storing a plurality of message translations, wherein each message translation comprises a translation name and a plurality of message attributes, at least one of the message attributes describing a message type; and
   a plurality of software modules operable under the control of a single operating system, wherein each of the plurality of software modules:
      is operable to either send or receive messages with at least one other software module in the system, and
      comprises a common message handling control operable to send messages and to associate a message to be sent with message attributes of at least one of the plurality of message translations.

2. The software system of claim 1 wherein the system further comprises at least one software module that does not comprise the common message handling control.

3. The software system of claim 1, further comprising a hierarchical file directory system including subdirectories, and wherein the Keeper stores message translation names in a separate subdirectory for each of the plurality of software modules of the system that comprises the common message handling control.

4. The software system of claim 1, further comprising
   a Router operable:
      to be the only software module that receives messages sent by the common message handling controls of the plurality of software modules; and
      for each message it receives from another software module that includes the common message handling control, to:
         determine from a routing table each other software module in the system to which the received message should be sent; and
         send the message to each such other software module in the system via the common message handling control of such other software module.

5. The software system of claim 4, wherein each message sent by a software module using the common message handling control has a hierarchical structure.

6. The software system of claim 1 wherein the message translations stored by the Keeper each comprise the following message attributes: (a) the name of the module the message is intended for; (b) the type of module the message is intended for; (c) the name of the module originating the message; and (d) the type of module originating the message.

7. The software system of claim 6 wherein a message attribute may be a universal match indicator.

8. The software system of claim 6 wherein a message attribute may comprise a macro.

9. A method of updating a software system comprising:
   providing a software system of claim 1 and a routing table indicating which software modules should receive which message translations;
   adding a software module to the software system, wherein the added module comprises the common message handling control; and
   updating the routing table to indicate that the added module should receive messages matching the attributes of a previously defined message translation.

10. The method of claim 9, further comprising the step of creating at least one new message translation defining a message type to be receivable by the new module and storing the new message translation in the Keeper.

11. A software system comprising multiple modules operable under the control of a single operating system in which the modules send and receive messages amongst each other, comprising:
   a software message control included in each of a plurality of modules operable to send and receive messages, and to associate each message with one of a plurality of message translations,
   each message translation comprising a translation name and a plurality of message attributes,
   a routing table indicating each of the plurality of modules that should receive messages having specified message attributes,
   a router module that:
      receives encoded messages from the plurality of modules that include the software control;
      accesses the routing table to determine the modules to which a received encoded message should be sent based on matching the message attributes of the encoded message with the message attributes specified for each of the plurality of modules,
      sends encoded received messages to each of the plurality of modules that should receive messages as indicated in the routing table;
   wherein at least one of the messages receivable by the router includes a message specifying that the particular module from which the message is received should receive messages matching a message attributes of a message translation, and wherein the Router is operable, upon receipt of such a message, to send future messages having message attributes that match the specified message attributes to the particular module.

12. The software system of claim 11 wherein the included software message control encodes each messages sent, and decodes each message received, according to a common message format, including a message address format.

13. The software system of claim 12, wherein the common message format is hierarchical.

14. The software system of claim 11 wherein the included software message control comprises an activex control.

15. A method, in a software system comprising multiple modules operable under the control of a single operating system, for transmitting messages among such modules comprising:

providing a software message control in each of a plurality of modules;

sending and receiving messages to and from the plurality of modules according to a common message format;

providing a routing table containing filter conditions indicating which of the plurality of modules should receive messages matching a plurality of message attributes;

providing a router module;

causing the router module to receive encoded messages from the plurality of modules that include the software control, wherein each encoded message is associated with a plurality of message attributes;

accessing the routing table to determine the modules to which a received encoded message should be sent based on the message attributes of the message;

sending encoded received messages to each of the plurality of modules that should receive messages as indicated by the routing table; and changing, during execution of the software system and in response to a message from a module received by the Router, the filter conditions indicating which of the plurality of modules should receive messages matching a plurality of message attributes.

16. A software system comprising:

a plurality of software modules operable under the control of a single operating system;

wherein each of the plurality of software modules includes a software messaging control operable to either send or receive messages with at least one other software module in the system, and wherein the messaging control comprises means for dynamically defining the format of a message;

comprises means for building a message to be sent according to a common message format by the software module specifying data element names and values;

comprises means for receiving from the software module in which it is included a data element name for data contained in a received message, and means for parsing the received message and providing the software module with the data corresponding to the data element name, regardless of the order of the data elements in the received message.

17. The software system of claim 16 wherein the software messaging control is an activex control.

18. The software system of claim 17 wherein the software messaging control of at least one of the plurality of software modules comprises a property which may be set to cause the activex control to confirm to a software module that sends it a message, the receipt of the message by the at least one of the plurality of software modules in which the software messaging control is included.

19. The software system of claim 16 wherein the common message format hierarchically defines the sequence of data elements in a message.

20. The software system of claim 16 further comprising:

a Keeper database comprising a plurality of message translations for at least one of the plurality of software modules in which the software messaging control is embedded, and wherein the at least one of the plurality of software modules in which the software messaging control is embedded is operable to associate a message translation from the Keeper database with each message sent by the module.

21. A software system comprising:

a plurality of software modules operable under the control of a single operating system; each such software module comprising:

means for sending messages between the plurality of software modules, each message comprising data elements comprising a plurality of keys and a data value associated with each key;

message building means for building a message to be sent, such that the keys and their associated data values may be inserted into a message in any order; and message parsing means for retrieving a message data value based on a key, regardless of the sequence of the data value in the message.

22. The software system of claim 21 wherein the message building means builds the data elements in a message in an hierarchical order.

23. The software system of claim 21 wherein the message building means is referenced in each of the plurality of software modules.

24. The software system of claim 21 wherein the message parsing means is referenced in each of the plurality of software modules.

25. The software system of claim 21 wherein the sequence of data elements of each message to be sent is dynamically constructed during execution of the software system.

* * * * *